(12) United States Patent
Fetvedt

(10) Patent No.: US 10,731,571 B2
(45) Date of Patent: Aug. 4, 2020

(54) SYSTEMS AND METHODS FOR CONTROLLING A POWER PLANT

(71) Applicant: 8 Rivers Capital, LLC, Durham, NC (US)

(72) Inventor: Jeremy Eron Fetvedt, Raleigh, NC (US)

(73) Assignee: 8 Rivers Capital, LLC, Durham, NC (US)

( * ) Notice: Subject to any disclaimer, the term of this patent is extended or adjusted under 35 U.S.C. 154(b) by 497 days.

(21) Appl. No.: 15/440,196

(22) Filed: Feb. 23, 2017

(65) Prior Publication Data
US 2017/0248083 A1    Aug. 31, 2017

Related U.S. Application Data

(60) Provisional application No. 62/300,504, filed on Feb. 26, 2016.

(51) Int. Cl.
*F02C 9/54* (2006.01)
*F02C 9/26* (2006.01)
(Continued)

(52) U.S. Cl.
CPC .............. *F02C 9/54* (2013.01); *F02C 3/34* (2013.01); *F02C 7/057* (2013.01); *F02C 9/20* (2013.01);
(Continued)

(58) Field of Classification Search
CPC ...... F02C 1/08; F02C 1/10; F02C 3/34; F02C 9/16; F02C 9/24; F02C 9/26; F02C 9/263;
(Continued)

(56) References Cited

U.S. PATENT DOCUMENTS

| 3,369,361 A | 2/1968 | Craig |
| 3,376,706 A | 4/1968 | Angelino |

(Continued)

FOREIGN PATENT DOCUMENTS

| CN | 1898499 | 1/2007 |
| CN | 101201171 | 6/2008 |

(Continued)

OTHER PUBLICATIONS

Allam et al., "High Efficiency and Low Cost of Electricity Generation from Fossil Fuels While Eliminating Atmospheric Emissions, Including Carbon Dioxide," *GHGT-11, Energy Procedia* 00, 2012, pp. 1-12.

(Continued)

*Primary Examiner* — Gerald L Sung
*Assistant Examiner* — James P Mcglynn
(74) *Attorney, Agent, or Firm* — Womble Bond Dickinson (US) LLP

(57) ABSTRACT

The present disclosure relates to systems and methods that are useful in control of one or more aspects of a power production plant. More particularly, the disclosure relates to power production plants, methods of starting power production plants, and methods of generating power with a power production plant wherein one or more control paths are utilized for automated control of at least one action. The present disclosure more particularly relates to power production plants, control systems for power production plants, and methods for startup of a power production plant.

20 Claims, 18 Drawing Sheets

(51) Int. Cl.
*F02C 3/34* (2006.01)
*F02C 9/32* (2006.01)
*F02C 9/34* (2006.01)
*F02C 9/16* (2006.01)
*F02C 7/057* (2006.01)
*F02C 9/20* (2006.01)

(52) U.S. Cl.
CPC ............... *F02C 9/26* (2013.01); *F02C 9/263* (2013.01); *F02C 9/16* (2013.01); *F02C 9/32* (2013.01); *F02C 9/34* (2013.01); *F05D 2220/32* (2013.01); *F05D 2220/76* (2013.01); *F05D 2270/053* (2013.01); *F05D 2270/303* (2013.01); *F05D 2270/306* (2013.01); *F05D 2270/335* (2013.01)

(58) Field of Classification Search
CPC ...... F02C 9/28; F02C 9/32; F02C 9/34; F02C 9/50; F05D 2270/112; F05D 2270/303
See application file for complete search history.

(56) References Cited

U.S. PATENT DOCUMENTS

| | | |
|---|---|---|
| 3,503,208 A | 3/1970 | Schmidt |
| 3,544,291 A | 12/1970 | Schlinger et al. |
| 3,736,745 A | 6/1973 | Karig |
| 3,837,788 A | 9/1974 | Craig et al. |
| 3,868,817 A | 3/1975 | Marion et al. |
| 3,971,211 A | 7/1976 | Wethe et al. |
| 3,976,443 A | 8/1976 | Paull et al. |
| 4,132,065 A | 1/1979 | McGann |
| 4,154,581 A | 5/1979 | Nack et al. |
| 4,191,500 A | 3/1980 | Oberg et al. |
| 4,193,259 A | 3/1980 | Muenger et al. |
| 4,206,610 A | 6/1980 | Santhanam |
| 4,275,557 A * | 6/1981 | Marvin .......... F02C 9/28 60/39.281 |
| 4,350,008 A * | 9/1982 | Zickwolf, Jr. .......... F02C 7/26 60/39.281 |
| 4,434,613 A | 3/1984 | Stahl |
| 4,498,289 A | 2/1985 | Osgerby |
| 4,522,628 A | 6/1985 | Savins |
| 4,602,483 A | 7/1986 | Wilks et al. |
| 4,702,747 A | 10/1987 | Meyer et al. |
| 4,721,420 A | 1/1988 | Santhanam et al. |
| 4,735,052 A * | 4/1988 | Maeda .......... F02C 9/28 60/733 |
| 4,765,143 A | 8/1988 | Crawford et al. |
| 4,765,781 A | 8/1988 | Wilks et al. |
| 4,839,030 A | 6/1989 | Comolli et al. |
| 4,852,996 A | 8/1989 | Knop et al. |
| 4,881,366 A | 11/1989 | Nurse |
| 4,957,515 A | 9/1990 | Hegarty |
| 4,999,992 A | 3/1991 | Nurse |
| 4,999,995 A | 3/1991 | Nurse |
| 5,175,995 A | 1/1993 | Pak et al. |
| 5,247,791 A | 9/1993 | Pak et al. |
| 5,265,410 A | 11/1993 | Hisatome |
| 5,345,756 A | 9/1994 | Jahnke et al. |
| 5,353,721 A | 10/1994 | Mansour et al. |
| 5,394,686 A | 3/1995 | Child et al. |
| 5,415,673 A | 5/1995 | Hilton et al. |
| 5,421,166 A | 6/1995 | Allam et al. |
| 5,507,141 A | 4/1996 | Stigsson |
| 5,520,894 A | 5/1996 | Heesink et al. |
| 5,533,329 A * | 7/1996 | Ohyama .......... F23R 3/26 60/39.27 |
| 5,590,519 A | 1/1997 | Almlöf et al. |
| 5,595,059 A | 1/1997 | Huber et al. |
| 5,692,890 A | 12/1997 | Graville |
| 5,709,077 A | 1/1998 | Beichel |
| 5,715,673 A | 2/1998 | Beichel |
| 5,724,805 A | 3/1998 | Golomb et al. |
| 5,802,840 A | 9/1998 | Wolf |
| 5,906,806 A | 5/1999 | Clark |
| 5,937,652 A | 8/1999 | Abdelmalek |
| 6,024,029 A | 2/2000 | Clark |
| 6,092,362 A * | 7/2000 | Nagafuchi .......... F02C 9/34 60/39.281 |
| 6,148,602 A | 11/2000 | Demetri |
| 6,170,264 B1 | 1/2001 | Viteri et al. |
| 6,196,000 B1 | 3/2001 | Fassbender |
| 6,199,364 B1 | 3/2001 | Kendall et al. |
| 6,202,574 B1 | 3/2001 | Liljedahl et al. |
| 6,209,307 B1 | 4/2001 | Hartman |
| 6,260,348 B1 | 7/2001 | Sugishita et al. |
| 6,263,661 B1 | 7/2001 | Van der Burgt et al. |
| 6,269,624 B1 | 8/2001 | Frutschi et al. |
| 6,289,666 B1 | 9/2001 | Ginter |
| 6,298,664 B1 | 10/2001 | Åsen et al. |
| 6,333,015 B1 | 12/2001 | Lewis |
| 6,389,814 B2 | 5/2002 | Viteri et al. |
| 6,430,916 B2 | 8/2002 | Sugishita et al. |
| 6,532,745 B1 | 3/2003 | Neary |
| 6,536,205 B2 | 3/2003 | Sugishita et al. |
| 6,543,214 B2 | 4/2003 | Sasaki et al. |
| 6,550,234 B2 | 4/2003 | Guillard |
| 6,598,398 B2 | 7/2003 | Viteri et al. |
| 6,612,113 B2 | 9/2003 | Guillard |
| 6,622,470 B2 | 9/2003 | Viteri et al. |
| 6,629,414 B2 | 10/2003 | Fischer |
| 6,637,183 B2 | 10/2003 | Viteri et al. |
| 6,684,643 B2 | 2/2004 | Frutschi |
| 6,764,530 B2 | 7/2004 | Iijima |
| 6,775,987 B2 | 8/2004 | Sprouse et al. |
| 6,802,178 B2 | 10/2004 | Sprouse et al. |
| 6,820,689 B2 | 11/2004 | Sarada |
| 6,824,710 B2 | 11/2004 | Viteri et al. |
| 6,871,502 B2 | 3/2005 | Marin et al. |
| 6,877,319 B2 | 4/2005 | Linder et al. |
| 6,877,322 B2 | 4/2005 | Fan |
| 6,898,936 B1 | 5/2005 | Ochs et al. |
| 6,910,335 B2 | 6/2005 | Viteri et al. |
| 6,918,253 B2 | 7/2005 | Fassbender |
| 6,945,029 B2 | 9/2005 | Viteri |
| 6,945,052 B2 | 9/2005 | Frutschi et al. |
| 6,993,912 B2 | 2/2006 | Fischer |
| 7,007,474 B1 | 3/2006 | Ochs et al. |
| 7,007,486 B2 | 3/2006 | Sprouse et al. |
| 7,021,063 B2 | 4/2006 | Viteri |
| 7,022,168 B2 | 4/2006 | Schimkat et al. |
| 7,043,920 B2 | 5/2006 | Viteri et al. |
| 7,074,033 B2 | 7/2006 | Neary |
| 7,089,743 B2 | 8/2006 | Frutschi et al. |
| 7,111,463 B2 | 9/2006 | Sprouse et al. |
| 7,124,589 B2 | 10/2006 | Neary |
| 7,147,461 B2 | 12/2006 | Neary |
| 7,191,587 B2 | 3/2007 | Marin et al. |
| 7,191,588 B2 * | 3/2007 | Tanaka .......... F02C 7/228 60/39.27 |
| 7,192,569 B2 | 3/2007 | Stewart |
| 7,281,590 B2 | 10/2007 | Van de Waal |
| 7,284,362 B2 | 10/2007 | Marin et al. |
| 7,299,637 B2 | 11/2007 | Becker |
| 7,303,597 B2 | 12/2007 | Sprouse et al. |
| 7,328,581 B2 | 2/2008 | Christensen et al. |
| 7,334,631 B2 | 2/2008 | Kato et al. |
| 7,360,639 B2 | 4/2008 | Sprouse et al. |
| 7,363,764 B2 | 4/2008 | Griffin et al. |
| 7,377,111 B2 | 5/2008 | Agnew |
| 7,387,197 B2 | 6/2008 | Sprouse et al. |
| 7,402,188 B2 | 7/2008 | Sprouse |
| 7,469,544 B2 | 12/2008 | Farhangi |
| 7,469,781 B2 | 12/2008 | Chataing et al. |
| 7,516,607 B2 | 4/2009 | Farhangi et al. |
| 7,516,609 B2 | 4/2009 | Agnew |
| 7,547,419 B2 | 6/2009 | Sprouse et al. |
| 7,547,423 B2 | 6/2009 | Sprouse et al. |
| 7,553,463 B2 | 6/2009 | Zauderer |
| 7,615,198 B2 | 11/2009 | Sprouse et al. |
| 7,665,291 B2 | 2/2010 | Anand et al. |
| 7,717,046 B2 | 5/2010 | Sprouse et al. |

(56) References Cited

U.S. PATENT DOCUMENTS

| | | | |
|---|---|---|---|
| 7,722,690 B2 | 5/2010 | Shires et al. |
| 7,731,783 B2 | 6/2010 | Sprouse et al. |
| 7,739,874 B2 | 6/2010 | Nigro |
| 7,740,671 B2 | 6/2010 | Yows et al. |
| 7,740,672 B2 | 6/2010 | Sprouse |
| 7,814,975 B2 | 10/2010 | Hagen et al. |
| 7,826,054 B2 | 11/2010 | Zillmer et al. |
| 7,827,797 B2 | 11/2010 | Pronske et al. |
| 7,874,140 B2 | 1/2011 | Fan et al. |
| 7,882,692 B2 | 2/2011 | Pronske et al. |
| 7,927,574 B2 | 4/2011 | Stewart |
| 7,934,383 B2 | 5/2011 | Gutierrez |
| 7,950,243 B2 | 5/2011 | Gurin |
| 7,966,829 B2 | 6/2011 | Finkenrath et al. |
| 8,043,588 B2 | 10/2011 | Hustad et al. |
| 8,088,196 B2 | 1/2012 | White et al. |
| 8,099,227 B2 * | 1/2012 | Shafique | F01D 25/18 701/100 |
| 8,109,095 B2 | 2/2012 | Henriksen et al. |
| 8,220,248 B2 | 7/2012 | Wijmans et al. |
| 8,596,075 B2 | 12/2013 | Allam et al. |
| 8,776,532 B2 | 7/2014 | Allam et al. |
| 8,826,670 B2 * | 9/2014 | Hoffmann | F02C 9/22 415/146 |
| 8,850,789 B2 | 10/2014 | Evulet et al. |
| 8,959,887 B2 | 2/2015 | Allam et al. |
| 8,986,002 B2 | 3/2015 | Palmer et al. |
| 9,068,743 B2 | 6/2015 | Palmer et al. |
| 2002/0134085 A1 | 9/2002 | Frutschi |
| 2003/0131582 A1 | 7/2003 | Anderson et al. |
| 2003/0221409 A1 | 12/2003 | McGowan |
| 2004/0011057 A1 | 1/2004 | Huber |
| 2004/0112037 A1 * | 6/2004 | Yagi | F01D 15/10 60/39.3 |
| 2004/0123601 A1 | 7/2004 | Fan |
| 2004/0134197 A1 | 7/2004 | Marin |
| 2005/0126156 A1 | 6/2005 | Anderson et al. |
| 2006/0242907 A1 | 11/2006 | Sprouse et al. |
| 2007/0180768 A1 | 8/2007 | Briesch et al. |
| 2007/0274876 A1 | 11/2007 | Chiu et al. |
| 2008/0010967 A1 | 1/2008 | Griffin et al. |
| 2008/0104958 A1 | 5/2008 | Finkenrath et al. |
| 2008/0115500 A1 | 5/2008 | MacAdam et al. |
| 2008/0166672 A1 | 7/2008 | Schlote et al. |
| 2008/0187877 A1 | 8/2008 | Fitzsimmons et al. |
| 2008/0190214 A1 | 8/2008 | Ubowski et al. |
| 2008/0309087 A1 | 12/2008 | Evulet et al. |
| 2009/0025390 A1 | 1/2009 | Christensen et al. |
| 2009/0061264 A1 | 3/2009 | Agnew |
| 2009/0130660 A1 | 5/2009 | Faham et al. |
| 2009/0150040 A1 * | 6/2009 | Rofka | F02C 9/54 701/100 |
| 2009/0229271 A1 | 9/2009 | Ruyck et al. |
| 2009/0260585 A1 | 10/2009 | Hack et al. |
| 2009/0301054 A1 | 12/2009 | Simpson et al. |
| 2010/0018218 A1 | 1/2010 | Riley et al. |
| 2010/0024378 A1 | 2/2010 | Ackermann et al. |
| 2010/0024381 A1 | 2/2010 | Ackermann et al. |
| 2010/0024433 A1 | 2/2010 | Ackermann et al. |
| 2010/0031668 A1 | 2/2010 | Kepplinger |
| 2010/0077752 A1 | 4/2010 | Papile |
| 2010/0300063 A1 | 12/2010 | Palmer et al. |
| 2010/0326084 A1 | 12/2010 | Anderson et al. |
| 2011/0036011 A1 | 2/2011 | Sprouse et al. |
| 2011/0012773 A1 | 6/2011 | Freund et al. |
| 2011/0179799 A1 | 7/2011 | Allam et al. |
| 2011/0185701 A1 | 8/2011 | Koda et al. |
| 2011/0233940 A1 | 9/2011 | Aoyama et al. |
| 2011/0239651 A1 | 10/2011 | Aoyama et al. |
| 2012/0067054 A1 | 3/2012 | Palmer et al. |
| 2012/0067056 A1 | 3/2012 | Palmer et al. |
| 2012/0073261 A1 | 3/2012 | Palmer et al. |
| 2012/0237881 A1 | 9/2012 | Allam et al. |
| 2013/0104525 A1 | 5/2013 | Allam et al. |
| 2013/0118145 A1 | 5/2013 | Palmer et al. |
| 2013/0199195 A1 | 8/2013 | Allam et al. |
| 2013/0205746 A1 | 8/2013 | Allam et al. |
| 2013/0213049 A1 | 8/2013 | Allam et al. |
| 2013/0229018 A1 * | 9/2013 | Karni | F02C 3/20 290/1 R |
| 2013/0327050 A1 * | 12/2013 | Slobodyanskiy | F23L 7/00 60/772 |
| 2014/0000271 A1 | 1/2014 | Mittricker et al. |
| 2014/0053529 A1 | 2/2014 | Allam et al. |
| 2014/0331687 A1 | 11/2014 | Palmer et al. |
| 2015/0020497 A1 | 1/2015 | Iwai et al. |
| 2015/0027099 A1 | 1/2015 | Iwai et al. |
| 2015/0059313 A1 | 3/2015 | Itoh et al. |
| 2018/0156127 A1 * | 6/2018 | Hausmann | F02C 7/228 |

FOREIGN PATENT DOCUMENTS

| | | |
|---|---|---|
| CN | 101324203 | 12/2008 |
| CN | 102834670 | 12/2012 |
| CN | 103221640 | 7/2013 |
| EP | 1698829 | 9/2006 |
| JP | 2225905 | 9/1990 |
| JP | 6-26362 | 2/1994 |
| JP | 3110114 | 11/2000 |
| JP | 2000-337107 | 12/2000 |
| JP | 2001-132472 | 5/2001 |
| JP | 3454372 | 10/2003 |
| WO | WO 95/12757 | 5/1995 |
| WO | WO 2009/041617 | 4/2009 |
| WO | WO 2012/003079 | 1/2012 |

OTHER PUBLICATIONS

Combs, Jr. "An Investigation of the Supercritical CO2 Cycle (Feher Cycle) for Shipboard Application," 1977, *Submitted in Partial Fulfillment of the Requirements for the Degree of Ocean Engineer and the Degree of Master of Science in Mechanical Engineering at the Massachusetts Institute of Technology*, 148.

Dostal et al., "A Supercritical Carbon Dioxide Cycle for Next Generation Nuclear Reactors," 2004, (Research Paper) *Advanced Nuclear Power Technology Program at MIT*, 326 pages.

Hong et al., "Analysis of Oxy-Fuel Combustion Power Cycle Utilizing a Pressurized Coal Combustor," *Energy*, Available Online Jun. 21, 2009, pp. 1332-1340, vol. 34, No. 9.

Iantovski et al., "Highly Efficient Zero Emission CO2-Based Power Plant" *Energy Conyers. Mgmt*, 1997, Suppl. pp. S141-S146, vol. 38.

Mathieu et al., "Sensitivity Analysis of the MATIANT Cycle", *Energy Conversion & Management*, 1999, pp. 1687-1700, vol. 40.

Wall et al., "A Zero Emission Combustion Power Plant for Enhances Oil Recovery," *Energy*, 1995, pp. 823-828, vol. 20, No. 8.

Yantovskii et al., "Computer Exergonomics of Power Plants Without Exhaust Gases," Energy Conyers. Mgmt., Publ. 1992, vol. 33, No. 5-8, pp. 405-412.

http://www.graz-cycle.tugraz.at/pdfs/Bolland_Kvamsdal_Boden_Liege.pdf; Boland, "A Thermodynamic Comparison of the Oxy-Fuel Power Cycles Water-Cycle, Graz-Cycle and Matiant-Cycle," *Norwegian University of Science and Technology*, Trondheim, Norway.

http://www2.ulg.ac.be/genienuc/pageco2.htm; Université de Liège, Department of Power Generation, "CO2 Researches".

* cited by examiner

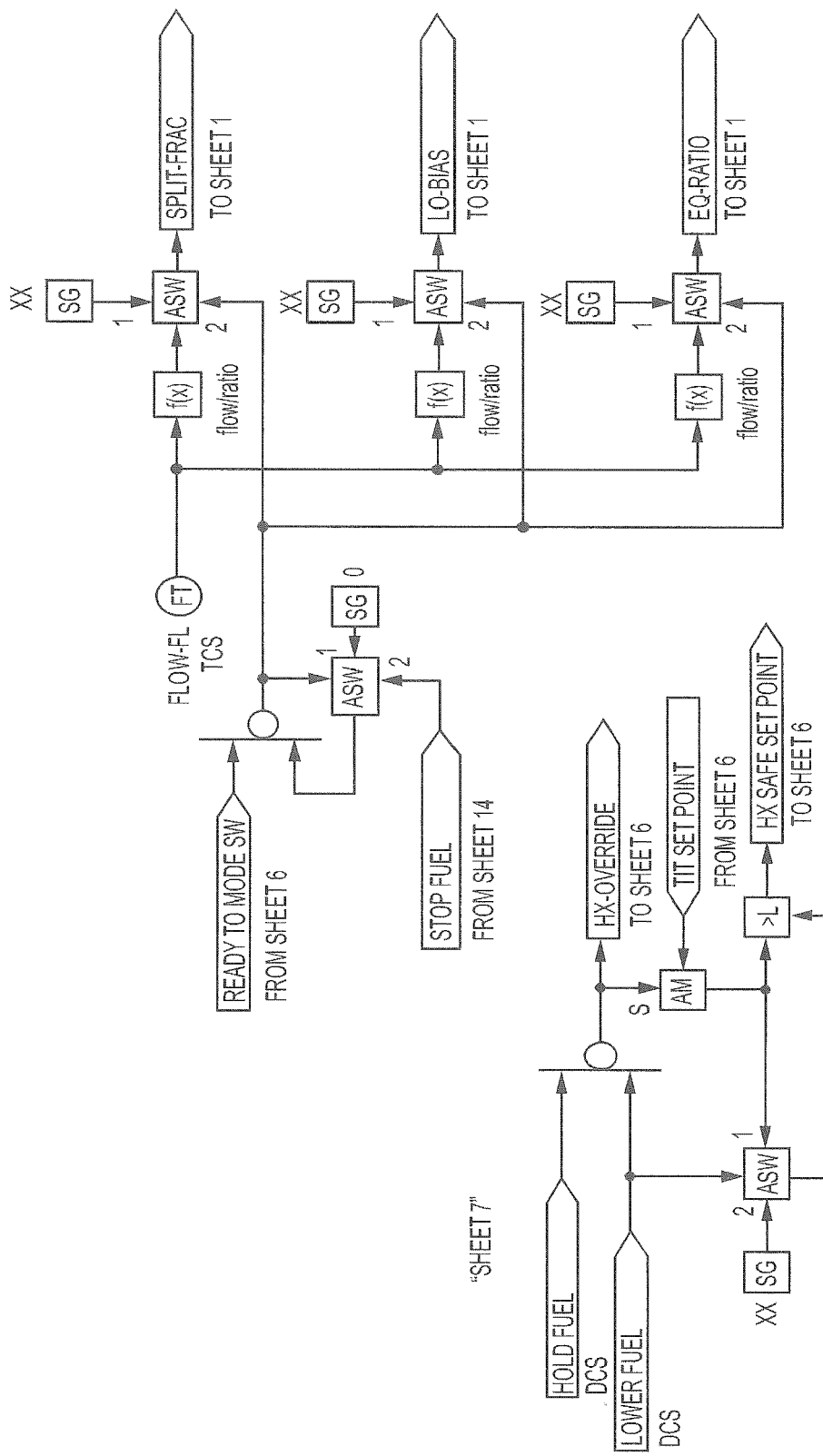

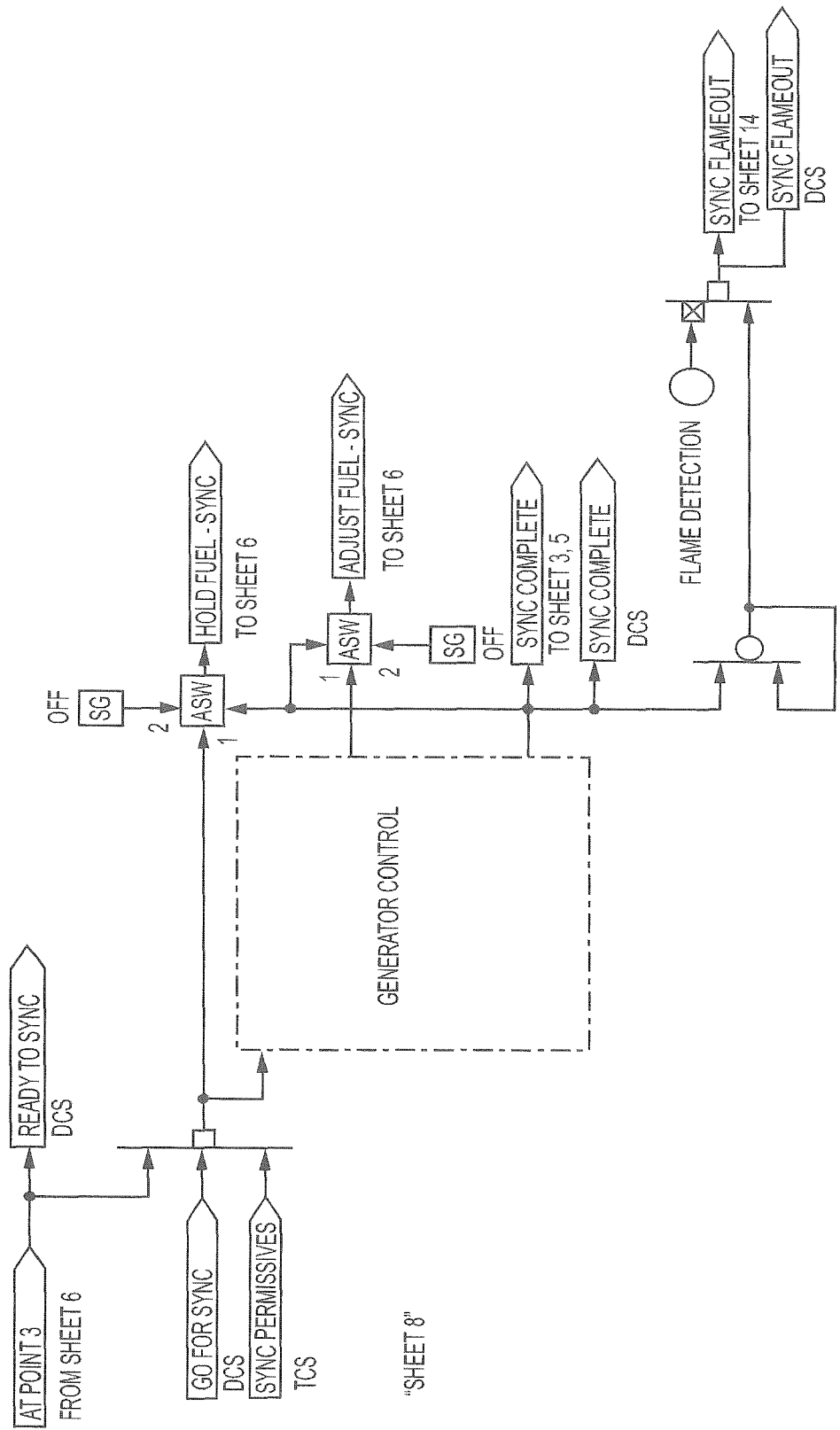

SYSTEMS AND METHODS FOR CONTROLLING A POWER PLANT

CROSS-REFERENCE TO RELATED APPLICATIONS

The present application claims priority to U.S. Provisional Application No. 62/300,504, filed Feb. 26, 2016, the disclosure of which is incorporated herein by reference.

FIELD OF THE DISCLOSURE

The presently disclosed subject matter relates to systems and methods for controlling the various aspects of a power plant. More particularly, the systems and methods can utilize a variety of signals and functions to control pressures, temperatures, fluid flows, switches, valves, and the like during multiples phases of the start-up, running, and shut-down of a power plant.

BACKGROUND

As the world-wide demand for electrical power production increases there is a continuing need for additional power production plants to meet such needs. Because of market demands, it is desirable for such power production to be achieved with the greatest possible efficiency; however, growing requirements for carbon capture have required technological advances. For example, U.S. Pat. No. 8,596,075 to Allam et al., the disclosure of which is incorporated herein by reference, provides for desirable efficiencies in oxy-fuel combustion systems utilizing a recycle $CO_2$ stream wherein the $CO_2$ is captured as a relatively pure stream at high pressure. Such advanced power production systems require control considerations that have not heretofore been provided. Accordingly, there is a need for further systems and methods suitable for controlling multiple aspects of power plants, particularly power plants configured for high efficiency power production with substantially complete carbon capture.

SUMMARY OF THE DISCLOSURE

The present disclosure provides systems and methods for power production wherein one or more control paths are utilized for automated control of one or more actions. The automated controls can be based upon a variety of signal inputs, calculated values, pre-set values, measured values, logical functions, computer algorithms, or computer program inputs.

In one or more embodiments, the present disclosure can relate to a control system for a power production plant. For example, the control system can comprise a flow control logic sequence adapted for selecting the lower of a FUEL FLOW DEMAND signal for flow of a fuel to a combustor and a TURBINE INLET TEMPERATURE signal for a temperature of an inlet of a turbine, and regulating one or both of a mass and a pressure of the fuel flowing from a fuel supply system to the combustor. In further embodiments, the control system for a power production plant can be described in relation to any one or more of the following statements, which may be combined in any number or order.

The control system can comprise: a POWER ACTUAL signal relaying the actual power production by the power production plant at a given time; and a POWER DEMAND signal relaying the desired power production by the plant at the same given time; wherein the control system is configured to calculate a differential between the POWER DEMAND signal and the POWER ACTUAL signal and to convert the differential into the FUEL FLOW DEMAND signal.

The control system can generate the TURBINE INLET TEMPERATURE signal as a selection of the highest of a plurality of calculated temperature signals each respectively derived from different calculation routines for calculating the temperature at the inlet of the turbine.

The control system can be adapted to adjust a ratio of a mass or a volume of fuel flowing through two or more different fuel lines from the fuel supply system to the combustor.

The control system can be adapted to open/close flow control valves in each of the two or more different fuel lines.

The control system can be adapted to open/close at least one pressure control valve in each of the two or more different fuel lines.

The control system can be adapted to adjust a ratio of a mass or a volume of oxidant flowing through two or more different oxidant lines from an oxidant supply system to the combustor.

The power production plant can include at least a primary set of fuel and oxidant lines and a secondary set of fuel and oxidant lines, and wherein the control system is adapted to adjust a fuel to oxidant ratio in the primary set of fuel and oxidant lines independent of a fuel to oxidant ratio in the secondary set of fuel and oxidant lines.

The power production plant can include a line providing a stream of recycled $CO_2$, wherein a portion of the stream of recycled $CO_2$ is added to one or more of the oxidant lines, and wherein the control system is adapted to adjust an oxygen concentration in one or more of the oxidant lines by adjusting an amount of the recycled $CO_2$ that is added to the oxidant line.

The oxygen concentration in each of the one or more oxidant lines can be adjusted independently from the remaining oxidant lines.

The can be adapted to adjust an equivalence ratio between the mass or volume of oxidant flowing through the primary oxidant line and the secondary oxidant line.

The control system can be adapted to close a flow control valve in a primary fuel line from the fuel supply system to the combustor so that substantially no fuel flows through the primary fuel line and is adapted to open a flow control valve in a secondary fuel line from the fuel supply system to the combustor so that substantially all of the fuel flowing to the combustor is flowing through the secondary fuel line.

The control system can be adapted to adjust an equivalence ratio between the mass or volume of fuel flowing through the primary fuel line and the secondary fuel line.

The control system can be adapted to provide the configuration of the flow control valve in the primary fuel line and the flow control valve in the secondary fuel line during startup of the power production plant and is configured to synchronize opening of the valve in the primary fuel line with a working condition of one or both of the turbine and a compressor that compresses a stream of recycled $CO_2$ flowing to the combustor.

The control system can be adapted to hold or lower the mass or volume of fuel flowing through at least one of the two or more different fuel lines from the fuel supply system to the combustor in response to an input signal indicating an operating temperature of a heat exchanger is approaching or exceeding a predefined operating maximum temperature or rate of heat increase.

In one or more embodiments, the present disclosure further can relate to a power production system. For example, a power production plant according to the present disclosure can comprise: a combustor; a turbine; a generator; a fuel supply system; an oxidant supply system; a control system having a plurality of control paths for automated control of at least one act in operation of the power production plant, said control system including: a control path adapted to generate a control signal that is a function of a comparison of a FUEL FLOW DEMAND signal for flow of a fuel to the combustor and a TURBINE INLET TEMPERATURE signal for a temperature of an inlet of the turbine, said fuel flow control path including a logic sequence adapted for selecting the lower of the FUEL FLOW DEMAND signal and the TURBINE INLET TEMPERATURE signal, and said generated control signal being effective to regulate one or both of the mass and pressure of fuel flowing from the fuel supply system to the combustor. In further embodiments, the power production system can be described in relation to any one or more of the following statements, which may be combined in any number or order.

The FUEL FLOW DEMAND signal can be a function of a comparison of a POWER ACTUAL signal relaying the actual power production by the power production plant at a given time and a POWER DEMAND signal relaying the desired power production by the plant at the same given time.

The control system can be configured to generate the TURBINE INLET TEMPERATURE signal as a selection of the highest of a plurality of calculated temperature signals each respectively derived from different calculation routines for calculating the temperature at the inlet of the turbine.

The fuel supply system can comprise at least two separately controlled fuel lines configured for passage of fuel to the combustor.

The fuel supply system can comprise at least one flow control valve and at least one pressure control valve in each of the at least two separately controlled fuel lines.

The oxidant supply system can comprise at least two separately controlled oxidant lines configured for passage of oxidant to the combustor.

The oxidant supply system can comprise at least one flow control valve in each of the at least two separately controlled oxidant lines.

The oxidant supply system can comprise an equivalence ratio control element configured to adjust an equivalence ratio between the mass or volume of oxidant flowing through the at least two separately controlled oxidant lines.

The power production plant can be configured such that one of the at least two separately controlled oxidant lines is a secondary oxidant flow line that comprises a flow sensor, wherein one of the at least two separately controlled fuel lines is a secondary fuel flow line that comprises a flow sensor, and wherein the control system includes a ratio control element configured to open or close the flow control valve in the secondary oxidant flow line based upon a mass or volume flow of fuel through the secondary fuel flow line.

In additional embodiments, the present disclosure also can relate to methods for start-up of a power production plant. For example, such methods can comprise executing a series of control signals wherein: a flow valve in a secondary fuel flow line is at least partially opened so that fuel from a fuel source begins to flow to a combustor while substantially no fuel flows from the fuel source to the combustor in a primary fuel flow line; a flow valve in a secondary oxidant flow line is at least partially opened so that oxidant from an oxidant source begins to flow to the combustor while substantially no oxidant flows from the oxidant source to the combustor in a primary oxidant flow line; a turbine is ramped up from a first speed to a second, higher speed; after the turbine is ramped to at least the second speed, an equivalence ratio of fuel flow in the primary fuel flow line to fuel flow in the secondary fuel flow line is adjusted so that a valve in the primary fuel flow line is opened, and fuel from the fuel source flows to the combustor in the primary fuel flow line; and after the turbine is ramped to at least the second speed, an equivalence ratio of oxidant flow in the primary oxidant flow line to oxidant flow in the secondary oxidant flow line is adjusted so that a valve in the primary oxidant flow line is opened, and oxidant from the oxidant source flows to the combustor in the primary oxidant flow line.

BRIEF DESCRIPTION OF THE FIGURES

Reference will now be made to the accompanying drawings, which are not necessarily drawn to scale, and wherein:

FIG. 4g is SHEET 7 of the series of function block diagrams, FIG. 4g showing control paths useful in, for example, heat exchanger protection and calculating combustion ratios for a power production plant according to embodiments of the present disclosure;

FIG. 4h is SHEET 8 of the series of function block diagrams, FIG. 4h showing control paths useful in, for example, generator synchronization for a power production plant according to embodiments of the present disclosure;

FIG. 4*l* is SHEET 12 of the series of function block diagrams, FIG. 4*l* showing control paths useful in, for example, configuring turbine blade cooling temperatures and flow set points in a power production plant according to embodiments of the present disclosure;

DETAILED DESCRIPTION

The present subject matter will now be described more fully hereinafter with reference to exemplary embodiments thereof. These exemplary embodiments are described so that this disclosure will be thorough and complete, and will fully convey the scope of the subject matter to those skilled in the art. Indeed, the subject matter can be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present disclosure relates to systems and methods adapted for controlling one or more actions in the operation of a power production plant. As such, the present disclosure further relates to power production plants including a variety of elements, including such control systems. Non-limiting examples of elements that may be included in a power production plant according to the present disclosure are described in U.S. Pat. Nos. 8,596,075, 8,776,532, 8,959,887, 8,986,002, 9,068,743, U.S. Pat. Pub. No. 2010/0300063, U.S. Pat. Pub. No. 2012/0067054, U.S. Pat. Pub. No. 2012/0237881, and U.S. Pat. Pub. No. 2013/0213049, the disclosures of which are incorporated herein by reference.

Figure 1:
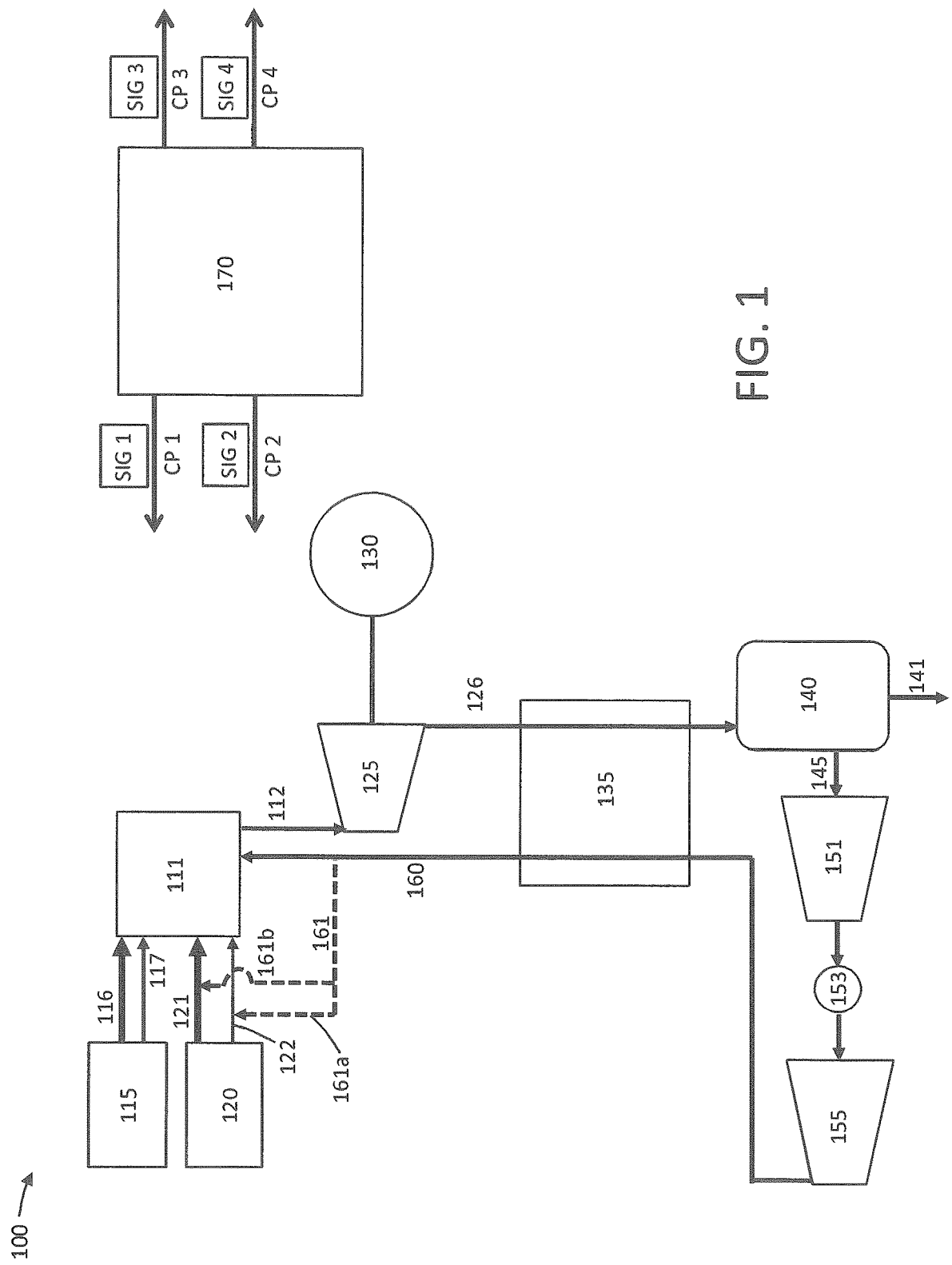
FIG. 1 is a flow diagram for a power production plant according to embodiments of the present disclosure.

In one or more embodiments, a power production plant may include some combination of the elements shown in FIG. 1 (although it is understood that further elements may also be included). As seen therein, a power production plant 100 can include a combustor 111 configured to receive fuel from a fuel supply 115 and oxidant from an oxidant supply 120. Fuel can flow from the fuel supply 115 in a primary fuel line 116 and/or a secondary fuel line 117. The fuel supply 115 and the fuel supply lines 116, 117 can form a fuel system. Oxidant likewise can flow from the oxidant supply 120 in a primary oxidant line 121 and/or a secondary oxidant line 122. The oxidant supply 120 and the oxidant supply lines 121, 122 can from an oxidant system. While a plurality of fuel supply lines and oxidant supply lines are illustrated, it is understood that only a single fuel supply line may be used and/or only a single oxidant supply line may be used. Likewise, more than two fuel supply lines may be used and/or more than two oxidant supply lines may be used. The fuel is combusted in the combustor 111 with the oxidant in the presence of a recycle $CO_2$ stream provided in line 160 and/or in line 121 in admixture with the oxidant and/or in line 122 in admixture with the oxidant. The combustion product stream in line 112 is expanded across a turbine 125 to produce power with a combined generator 130. Although the combustor 111 and turbine 125 are illustrated as separate elements, it is understood that, in some embodiments, a turbine may be configured so as to be inclusive of the combustor. In other words, a single turbine unit may include a combustion section and an expansion section. Accordingly, discussion herein of passage of streams into a combustor may also be read as passage of streams into a turbine that is configured for combustion as well as expansion.

Turbine exhaust in stream 126 is cooled in a heat exchanger 135. Although a single heat exchanger 135 is illustrated, it is understood that the heat exchanger may be a single unit with a plurality of sections operating in different temperature ranges. Likewise, a plurality of separate heat exchangers operating in different temperature ranges may be utilized. Water is separated through water line 141 in the separator 140 to produce a substantially pure recycle $CO_2$ stream 145 (although part of the stream may be withdrawn from the plant and/or diverted to other parts of the plant (e.g., for cooling the turbine) or to other lines (e.g., for combination with the oxidant and/or the fuel). The recycle $CO_2$ stream 145 is compressed in a multi-stage compressor including a first stage compressor 151, a second stage compressor 155, and an inter-stage cooler 153. Optionally, one or more further compressors or pumps may be added. Further, the compressor need not be a multi-stage compressor. The compressed recycle $CO_2$ stream in line 160 is passed back through the heat exchanger to the combustor. All or part of the recycle $CO_2$ stream in line 160 may be passed directly to the combustor 111. As illustrated in lines 161, 161*a*, and 161*b*, all or part of the recycle $CO_2$ stream can be input to one or both of the primary oxidant line 117 and the secondary oxidant line 122. Although not illustrated, it is understood that one or both of lines 161 and 161*b* may alternatively or additional provide $CO_2$ to one or both of the fuel supply lines 116, 117.

The illustrated power production plant further includes a control system 170 that has a plurality of control paths (CP1, CP2, CP3, and CP4 as illustrated) that are configured to provide for automated control of at least one act in operation of the power production plant. Each control path can be configured for generating at least one control signal (SIG 1, SIG 2, SIG 3, and SIG 4) that is effective to cause one or more responsive actions to occur. Non-limiting examples of such responsive actions can include executing a computer subroutine, carrying out a mathematical calculation, executing a logic function, altering the state of a valve, altering the mass flow of a fluid stream, altering the pressure of a fluid stream, generating a further control signal, and the like. A single control path may be configured to generate a single control signal or may be configured to generate a plurality of signals. Moreover, the power production plant can include a single control system or may include a plurality of control systems. For example, the control system 170 may be a distributed control system (DCS) that can be configured for top down control of all components of the power production plant. If desired, one or more elements of the power production plant can have a separate control system that can function in combination with the DCS or substantially autonomously from the DCS. For example, a turbine control system (TCS) can function independently of the DCS. Further, the DCS can send signals to the TCS (and vice versa) in order to carry out various functions of the power production methods. Accordingly, the power plant can comprise a single control system, or the power plant can comprise a plurality of control systems. Further, one single control system can manage one or more sub-control systems. In FIG. 1, the control system 170 may be a TCS, and the system can include a separate DCS.

The control system or systems can be configured to address a variety of control needs. In some embodiments, a control system can particularly relate to manners of controlling power output of the power production plant. In some embodiments, a control system can particularly relate to manners of controlling fuel flow and/or oxidant flow in the power production system. In some embodiments, a control system can particularly relate to controls for providing a substantially steady state system. Non-limiting examples of steady state conditions subject to specific control paths and/or control signals include turbine inlet temperature monitors and alarms, oxidant demand signals, case cooling flow and temperature, nozzle cooling flow and temperature, blade cooling flow and temperature, balance piston control, and heat exchanger protection. In one or more embodiments, a plurality of control paths and/or control signals may be utilized in combination. For example, plant start-up may utilize multiple control paths and control signals to ensure that the plant transitions from a shut-down state to a running state in a safe and efficient manner. In particular, start-up may be executed utilizing a plurality of waypoints wherein the necessary working conditions of each waypoint must be properly achieved before the control system allows start-up to proceed to the next waypoint. Thus, the control system may be particularly configured to ensure that a plurality of steps is carried out in a defined sequence achieving a defined result. Accordingly, the present disclosure can particularly provide one or more methods for controlling one or more aspects of a power production combustion cycle.

Control functions as described herein can particularly relate to specific changes in one or more operating conditions of the power production system in respond to a control signal being delivered from a control element to a functional component of the power production system. For example, a control function can include opening and/or closing one or more valves, increasing or decreasing pressure in a specific flow line, increasing or decreasing flow rate through a flow line, increasing or decreasing compression in a compressor or pump, and the like. Operational changes thus can be caused in response to a control signal from a control element. Further, the control signal may be generated by the control element based upon an input signal from one or more sensors, such as a pressure sensor, a flow sensor, a level sensor, and a temperature sensor.

Figure 2:
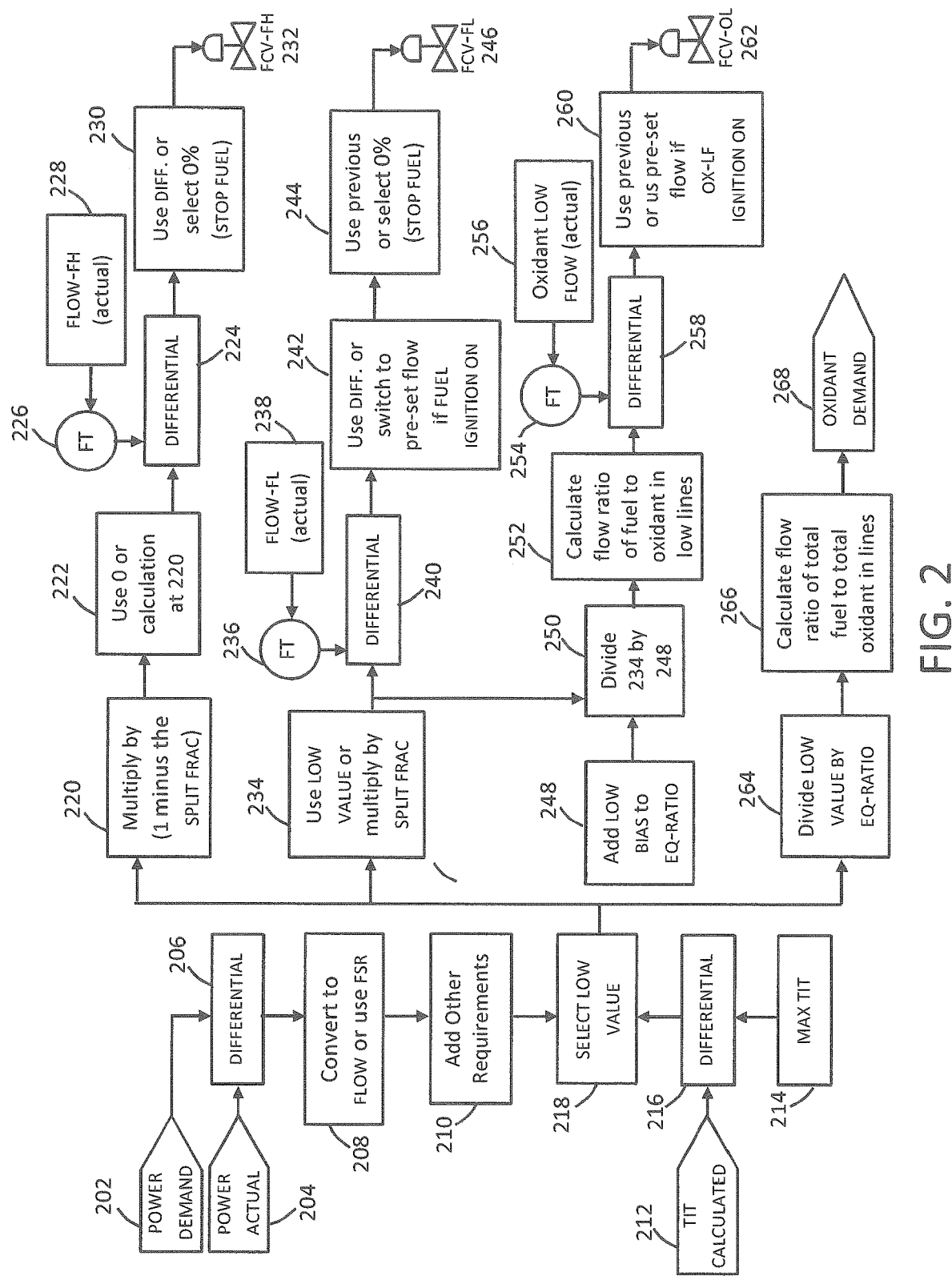
FIG. 2 is a function block diagram showing control paths carried out by a control system in operation of a power production plant according to embodiments of the present disclosure.

In one or more embodiments, power output in a power production system can be adjusted by utilizing power demand as a control signal. As such, the present disclosure can relate to a control system comprising one or more control paths for a power production system as well as a system and method suitable for implementation of the control path(s). Embodiments of suitable control paths are illustrated in FIG. 2. The control paths shown in FIG. 2 are further shown in FIG. 4a (SHEET 1). The control paths illustrated in FIG. 2 illustrate embodiments whereby fuel flows and/or oxidant flows can be switched (automatically or manually) two or more lines—e.g., between a primary fuel line (or a high flow fuel line) and a secondary fuel line (or a low flow fuel line) or between a primary oxidant line (or a high flow oxidant line) and a secondary oxidant line (or a low flow oxidant line). The control paths enable the ability to utilize a variable equivalence ratio for the respective flows between the respective lines. For example, the control system can define one or more control paths specifically adapted to control the amount of fuel that is passed through the primary fuel line (116 in FIG. 1) and the secondary fuel line (117 in FIG. 1) and/or one or more control paths specifically adapted to control the amount of oxidant that is passed through the primary oxidant line (121 in FIG. 1) and the secondary oxidant line (122 in FIG. 1). Control of fuel flow and/or oxidant flow can include opening and closing one or more valves in response to a control signal from a control element. Further, the control signal may be generated by the control element based upon an input signal from one or more sensors. In particular embodiments, such control can apply specifically during start-up of the power plant and/or during a changeover period between startup and full operation. As used herein, "full operation" can indicate that the combustor is in operation, the turbine and the main compressor(s) are synchronized, and the turbine is operating at a speed sufficient to operate the generator for power production.

In FIG. 2, a POWER DEMAND signal 202 and a POWER ACTUAL signal 204 can be output by the DCS and the generator control system (GCS) respectively. POWER DEMAND conveys the power output that is required at a given time, and POWER ACTUAL conveys the actual power output at a given time as measured by the generator. POWER DEMAND is compared to POWER ACTUAL, and the differential calculated at waypoint 206 can be used to generate a FUEL FLOW DEMAND signal. The control sequence thus is configured to convert a POWER DEMAND signal into a fuel flow signal, which can signal fuel flow in the primary fuel line and secondary fuel line to be at varying ratios. The FUEL FLOW DEMAND signal is calculated at waypoint 208 or, in the alternative, the power-to-flow function can be configured for generation of a conventional fuel stroke reference (FSR) signal. For example, the function at waypoint 206 can have an output signal of 0% to 100% instead of outputting a fuel flow rate as otherwise noted above. If using FSR mode, the following controller may be placed under manual control. The FUEL FLOW DEMAND signal arising from the function at waypoint 208 can be modified with one or more additional requirements at waypoint 210. For example, the FUEL FLOW DEMAND signal can be modified with a fuel requirement signal, such as a start-up fuel (SU-FUEL) signal from a start-up sequence. During start-up, POWER DEMAND can be essentially zero, and the SU-FUEL signal will thus direct the fuel flow requirement. As the process proceeds past start-up, POWER DEMAND will increase, and the SU-FUEL signal will eventually transition to null. In this manner, fuel flow is automatically adjusted as the POWER DEMAND signal changes.

The FUEL FLOW DEMAND signal generated at waypoint 208 of the control path shown in FIG. 2 can be read by one controller or a plurality of controllers. Further, the FUEL FLOW DEMAND signal can be applied to a plurality of different fuel lines and oxidant lines, which can vary based upon the number of fuel lines utilized in the power production system. As illustrated in FIG. 1, the control system includes: a path whereby fuel flow through a fuel control valve in a primary line (e.g., line 116 in FIG. 1) is controlled; a path whereby fuel flow through a fuel control valve is a secondary line (e.g., line 117 in FIG. 1) is controlled; a path whereby oxidant flow through a secondary line (e.g., line 122 in FIG. 1) is controlled; and a path whereby an oxidant demand signal is calculated, which signal can be used to control oxidant flow through a primary line (e.g., line 121 in FIG. 1). While use of the terms "primary fuel line," "secondary fuel line," "primary oxidant line," and "secondary oxidant line" can be used generally to delineate the plurality of fuel lines and oxidant lines that can be used, the terms can relate to specific purposes of the lines in practice. For example, in certain embodiments, a primary fuel line and a primary oxidant line can be adapted to provide a bulk of the fuel flow and/or the oxidant flow to the combustor during normal operation of the power production plant, while a secondary fuel line and a secondary oxidant line can be adapted to provide fuel flow and/or oxidant flow mainly during start-up of the plant. While two fuel flow and oxidant paths are illustrated, it is understood that two or more fuel flow paths and two or more oxidant flow paths are encompassed (e.g., three, four, five, or more flow paths). In some embodiments, flow demands for fuel and/or oxidant can be split based on a split fraction (SPLIT-FRAC) provided by the TCS (which is discussed further below).

Control systems according to the present disclosure further can calculate fuel and/or oxidant flows based at least in part on the turbine inlet temperature ("TIT") of the power producing turbine (element 125 in FIG. 1). In the control path illustrated in FIG. 2, a calculated turbine inlet temperature, TIT CALCULATED, can be input at waypoint 212 and compared against a maximum turbine inlet temperature, MAX TIT, input at waypoint 214 that can be pre-set, and can be based, for example, on the operation limits of the turbine or other components of the power production system (e.g., heat exchanger operation limits). The differential calculation at waypoint 216 is compared against the FUEL FLOW DEMAND signal as optionally adjusted at waypoint 210, and the lowest value is output at waypoint 218 for use in the further control paths illustrated in FIG. 2.

The top control path in FIG. 2 utilizes the selected low value 218 to calculate the fuel flow through the fuel control valve for the high flow line—i.e., the primary fuel flow line 116 in FIG. 1. The selected low value 218 is adjusted based upon a fractional signal (SPLIT FRAC) that is generated as otherwise described herein. The SPLIT FRAC value is subtracted from 1, and result is multiplied by the selected low value 218 at waypoint 220. In an exemplary embodiment of a start-up mode, an automatic switch in the control path can be closed by receiving a "zero" signal from a signal generator—see waypoint 222 in FIG. 2. In this manner, the control path can be forced to zero so that the flow control valve (FCV-FH) 232 for the high flow line is closed and substantially no fuel flows through the high flow fuel line. The entire fuel demand signal is thus sent via the second control path so that substantially all of the fuel flow is through the low flow fuel line controlled by the low flow fuel control valve—FCV-FL 246. Control signals generated in this regard can be adapted to open/close the flow control valve (FCV-FH) in the high flow line and/or the flow control valve (FCV-FL) in the low flow line. Such opening and closing of the valves in the fuel flow lines (e.g., lines 116 and 117 in FIG. 1) can be incremental as needed to provide the required mass flow or volume flow. Independent of the operating mode, the fuel flow control valves (FCV-FH and FCV-FL) preferably are configured to respond to the POWER DEMAND signal based upon the further modifications illustrated in FIG. 2. In this manner, the POWER DEMAND signal ultimately can function to increase and/or decrease the amount of fuel entering the combustor through any fuel flow line.

The signal generator will keep waypoint 222 defaulted to 0 until receiving a MODE signal that is generated as otherwise described herein. The MODE signal can be any signal that indicates that the power production process is in a condition wherein fuel flow through the high flow line is desired. For example, as noted above, during start-up, it can be desirable to provide fuel flow only through the low flow fuel line. Once as defined set of operating conditions has been met, the MODE signal can be generated, and fuel can begin to flow through the high flow line. At the time, the automatic switch controlling waypoint 222 will cause the control pathway to use the calculation from waypoint 220. That calculation is then compared against the actual flow of fuel through the high flow line FLOW-FH 228, which is measured in flow transducer 226. The differential calculated at waypoint 224 is then passed through the automatic switch at waypoint 230. This value will be used to control FCV-FH 232 unless operating conditions have caused a STOP FUEL signal to be generated—e.g., in the event of a power plant malfunction. The STOP FUEL signal, if generated, will cause the flow signal through waypoint 230 to switch to 0 so that no fuel flows through FCV-FH 232. Otherwise, FCV-FH 232 will open/close automatically to allow the mass or volume flow calculated according to the foregoing control path.

In a similar control path, the SELECT LOW VALUE generated at waypoint 218 can be used to automatically control fuel flow through the low flow fuel line by directing the opening and closing of the low flow line fuel control valve—FCV-FL 246. In particular, an automatic switch at waypoint 234 can default to using the LOW VALUE from waypoint 218 so that fuel flow is only through the low flow fuel line through FCV-FL 246. As before, the SPLIT FRAC signal can cause the automatic switch to alternate to the function of multiplying the LOW VALUE by the SPLIT FRAC value. Whichever value is passed through waypoint 234 is compared against the actual fuel flow through the low flow line as measured by the flow transducer 236 for FLOW-FL 238. The differential taken at waypoint 240 is then passed by default through the automatic switch at waypoint 242. The automatic switch, however, can alternate to a pre-set flow value if the controller generates a signal indicative of actual ignition in the combustor—i.e., a FUEL IGNITION ON signal. The pre-set flow can be any value; however, it typically may be maintained at a relatively low level so that the majority of the fuel flow is through the high flow fuel line during normal plant operations—i.e., after combustor ignition. As before, the low flow fuel control pathway also includes an automatic switch at waypoint 244 so that flow is forced to 0 if the STOP FUEL signal is generated. Otherwise, FCV-FL 246 will open/close automatically to allow the mass or volume flow calculated according to the foregoing control path.

The oxidant flow to the combustor through a low flow oxidant line (e.g., line 122 in FIG. 1) can also be controlled based in part on the low flow fuel line control path. This oxidant flow pathway is initially based on a bias signal (LOW BIAS) that is generated to default initial oxidant flow to the low flow line and an equivalence (EQ-RATIO) signal that is generated specify the amount of total oxidant flow that is allocated to the various oxidant flow lines. At waypoint 248 the LOW BIAS signal and the EQ-RATIO signal are added together, and this sum is used as a divisor for the value leaving waypoint 234 in the low flow fuel control pathway. At function waypoint 252 the flow ratio of fuel to oxidant in the low flow lines is calculated and is then compared at waypoint 258 against the actual oxidant flow through the low flow oxidant line—LOW FLOW 256—which is measured by flow transducer 254. The flow ratio can be based on the relative mass flow rates of the materials flowing through the respective lines (e.g., kilograms (kg) per second) or can be based on the relative volume flow rates of the materials flowing through the respective lines (e.g., cubic meters per second). The differential taken at waypoint 258 is passed to waypoint 260 where the automatic switch defaults to the use of the differential from waypoint 258. The automatic switch, however, can alternate to a pre-set flow value if the controller generates a signal indicative of actual oxidant ignition in the combustor—i.e., an OX-LF IGNITION ON signal. The pre-set flow can be any value; however, it typically may be maintained at a relatively low level so that the majority of the oxidant flow is through the high flow oxidant line during normal plant operations—i.e., after combustor ignition. The flow control valve in the low flow oxidant line FCV-OL 262 will thus open/close automatically to allow the mass or volume flow calculated according to the foregoing control path.

Oxidant flow through the high flow oxidant line may be controlled by a dedicated pathway similar to that described above for the low flow oxidant line. In some embodiments, however, an OXIDANT DEMAND signal can be generated and be sent to the DCS to control opening and closing of the oxidant flow control valve for the high flow oxidant line. As shown in FIG. 2, the LOW VALUE from waypoint 218 can be divided by the EQ-RATIO mentioned above at waypoint 274. Thereafter, a calculation function can be run at waypoint 266 to calculate the flow ratio of the total fuel flow through all fuel flow lines to the total oxidant flow through all oxidant flow lines. The result of the function at waypoint 266 is then sent as signal 268 to the DCS. The flow of oxidant through the high flow oxidant lines can then be automatically calculated based on the OXIDANT DEMAND signal and the flow through FCV-OL 262 that is calculated as described above. The flow ratio can be based on the relative mass flow rates of the materials flowing through the respective lines (e.g., kg per second) or can be based on the relative volume flow rates of the materials flowing through the respective lines (e.g., cubic meters per second).

Further to the foregoing, fuel to oxidant ratios can be calculated based on one or more of fuel flow, turbine speed, system pressures, or the like according to the function sequence illustrated in FIG. 4g (SHEET 7), wherein: SPLIT-FRAC is the fuel fraction ratio for fuel distribution between FCV-FH and FCV-FL; LO-BIAS is the equivalence ratio for FCV-FL; and EQ-RATIO is the fuel to oxidant ratio. Each of SPLIT-FRAC, LO-BIAS, and EQ-RATIO are calculated as functions of the total mass or volume fuel flow through the fuel lines as measured by a flow transducer. For each of the three, the signal can be biased to a defined value ("XX") via a signal generator until generation of the READY TO MODE SW signal indicating preparation to change from start-up mode to full function mode. As such, all of SPLIT-FRAC, LO-BIAS, and EQ-RATIO can have a starting value defined for suitable flows through the low flow lines during start-up of the power plant. SHEET 7 also exemplifies calculation routines for preventing overheating of the heat exchanger. For example, in some embodiments, the TCS can be configured to hold or lower the fuel input to the combustor through one or both of the high flow fuel line and the low flow fuel line. Such control can be based at least in part on a feedback signal from one or more sensors and/or from a control element that is ancillary to the TCS. Such feedback signal can be based, for example on a rate limit in some embodiments. In other embodiments, the feedback signal can be based on an input variable, such as an absolute limit on temperature, pressure, strain, or further variables. In some embodiments, the feedback signal may be indicative of a heat level in one or more of the recuperator heat exchanges that approaches or exceeds a pre-defined maximum value. In such instances, the control system can be configured to hold or lower fuel input as noted to control the turbine outlet temperature and thus the operating temperatures of the recuperator heat exchangers.

Provision of the LO-BIAS signal can allow for the oxidant stream in the start-up mode to have a different equivalence ratio than the oxidant stream in the normal operating mode. Moreover, the LO-BIAS signal allows for manipulation of the equivalence ratios (fuel to oxidant ratio) for the high line and the low line independent of each other. While there is an overall ratio of fuel to oxidant entering the combustor, the fuel to oxidant ratio for the high line can be different from the fuel to oxidant ratio for the low line. This allows for a significantly increased ability to more precisely control combustor function. In addition to altering the fuel to oxidant ratios, the present disclosure also provides for altering the chemistry of the oxidant streams. For example, the oxidant stream can include $O_2$ diluted with $CO_2$, and the amount of $CO_2$ included in the oxidant stream can be varied independently for the oxidant streams associate with the high line and the low line. Thus, the oxygen concentration entering the combustor from the high line can vary independent of the oxygen concentration entering the combustor from the low line. Thus, for all of the fuel/oxidant paths leading to the combustor, the present control system can allow for the equivalence ratios to be different and the chemistry of the oxidant streams to also be different. In light of the foregoing, a control element according to the present disclosure can be particularly adapted to adjust a ratio of a mass or a volume of fuel flowing through two or more different fuel lines from the fuel supply system to the combustor. Likewise, a control element according to the present disclosure can be particularly adapted to adjust a ratio of a mass or a volume of oxidant flowing through two or more different oxidant lines from an oxidant supply system to the combustor. Further, a control element according to the present disclosure can be particularly adapted to adjust a ratio of a mass or a volume of oxidant flowing through an oxidant line to the combustor relative to the mass or a volume of fuel flowing through a fuel line to the combustor. In all cases, the flow ratios can be based on the relative mass flow rates of the materials flowing through the respective lines (e.g., kg per second) or can be based on the relative volume flow rates of the materials flowing through the respective lines (e.g., cubic meters per second).

As seen from the foregoing, the present disclosure provides the ability to automatically switch between fuel flow through two or more flow lines. Fuel flow through two or more flow lines can be variable, and the flow ratios can be changed automatically based upon defined inputs. Thus, at any given point, 0% to 100% of the fuel flow to the combustor can be allocated to any of the two or more fuel flow lines.

In addition to the control pathways described in relation to FIG. 2, various further control pathways can be implemented by the control system in order to calculate various signals and values utilized in controlling fuel and oxidant flow to the combustor. For example, as seen in FIG. 1, turbine inlet temperature (TIT) can be utilized in the control paths to determine the proper fuel flow control signal.

Figure 4A:
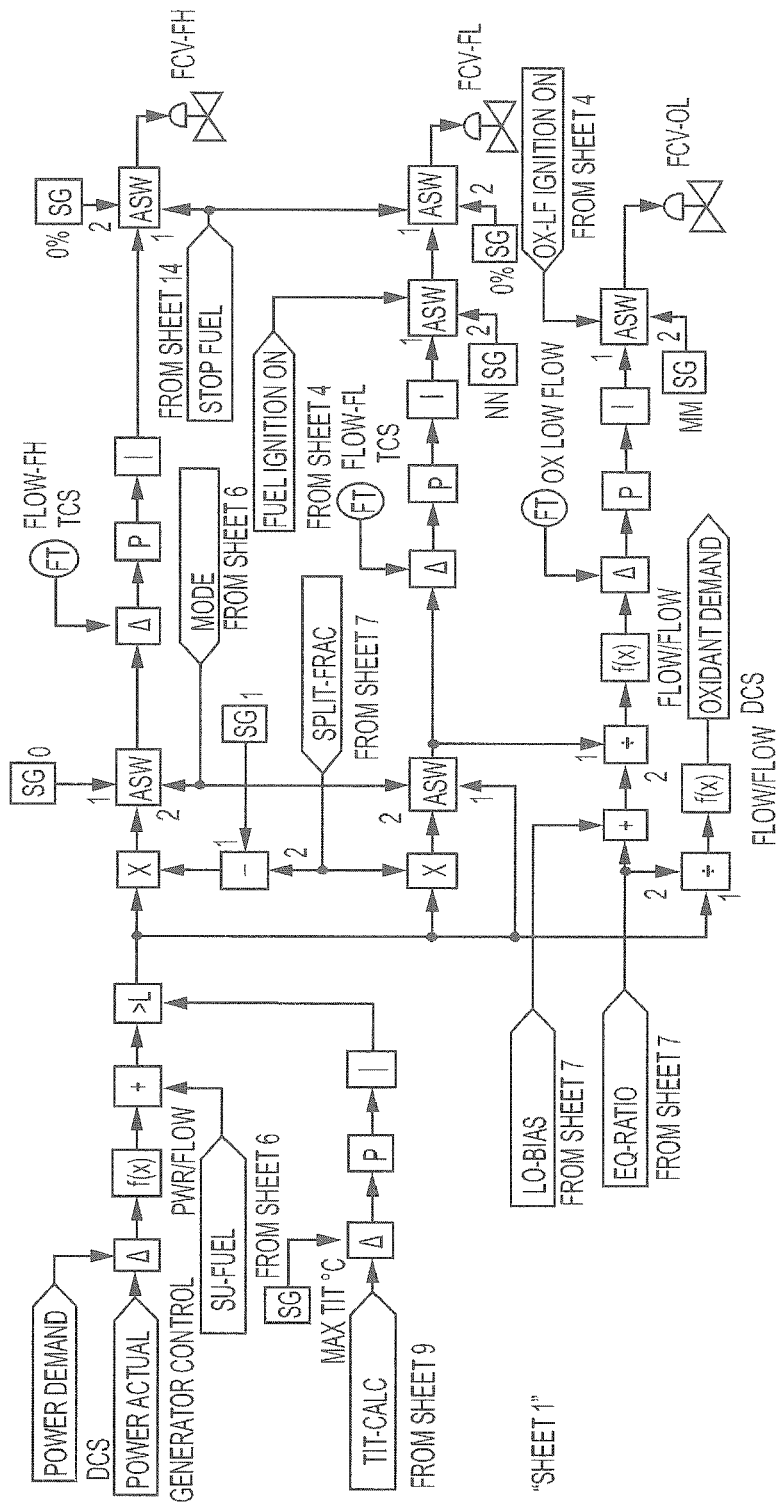
FIG. 4a is SHEET 1 of a series of function block diagrams, FIG. 4a showing control paths useful in, for example, steady state and power control demand for a power production plant according to embodiments of the present disclosure.
Figure 4B:
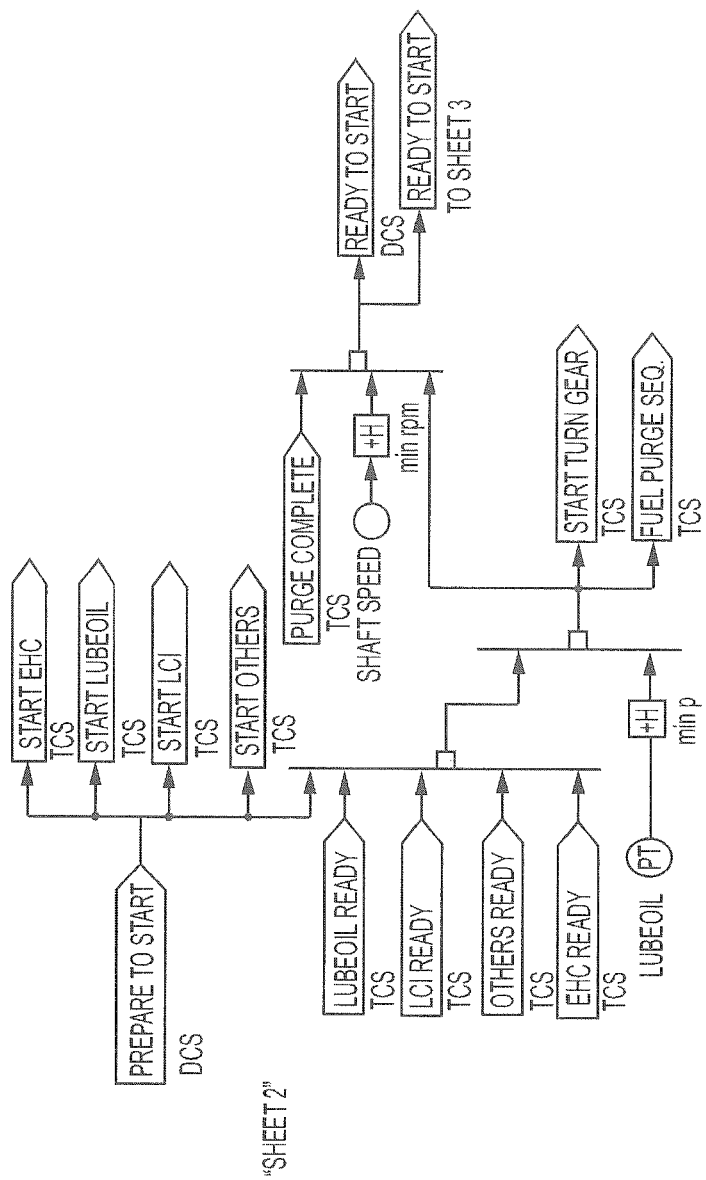
FIG. 4b is SHEET 2 of the series of function block diagrams, FIG. 4b showing control paths useful in, for example, initiating start-up for a power production plant according to embodiments of the present disclosure.

Because of the high temperature, high pressure conditions of the power production methods, direct temperature measurement at the turbine inlet can be prohibitively difficult. Accordingly, in embodiments of the present disclosure, the control systems calculate TIT using a plurality of calculation routines that can be based on a variety of inputs. As illustrated in FIG. 4i (SHEET 9), TIT is taken as the highest value [>H] of three different calculation routines. If desired, a greater number of calculation routines can be utilized. Further, only a single calculation routine may be used.

In FIG. 4i (SHEET 9), a first routing for calculating TIT is a direct calculation from various flows throughout the power production system. This can include receiving inputs in relation to temperature, pressure, mass flow, specific heat based on flow conditions, and heating value of fuel based on heat of formation of the products, for example. Each of the following flows (taken as mass flow or volume flow) is measured at respective flow sensing elements ("FE"): flow of fuel through the high flow fuel line (HF FUEL); flow of fuel through the low flow fuel line (LF FUEL); flow of oxidant through the low flow oxidant line (LF-OXIDANT); flow of oxidant through the high flow oxidant line (HF-OXIDANT); flow of recycled $CO_2$ (e.g., exiting the recycle compressor) for input to the combustor (RECYCLE); and flow of $CO_2$ for the nozzle cooling stream (NOZZLE COOLING). Each of the following pressures is measured at respective pressure transducers ("PT"): pressure for the low flow oxidant line (LF-OXIDANT); pressure for the high flow oxidant line (HF-OXIDANT); and pressure for the recycled $CO_2$ stream for input to the combustor (RECYCLE). Each of the following temperatures is measured at respective temperature transducers ("TT"): temperature for the flow through the low flow oxidant line (LF-OXIDANT); temperature for the flow through the high flow oxidant line (HF-OXIDANT); and temperature for the recycled $CO_2$ stream for input to the combustor (RECYCLE). Such direct calculation can utilize the total energy and mass entering the combustor and calculate the theoretical TIT.

A second routine for calculating TIT is a turbine performance calculation that can be based on the turbine pressure ratio. The pressure of the recycled $CO_2$ stream for input to the combustor (RECYCLE) is divided by the pressure of turbine stream exiting the turbine (EXHAUST) as measured by respective pressure transducers ("PT"). Turbine performance is calculated as a function of this pressure ratio and the temperature at the outlet of the turbine from which the turbine exhaust flows (EXHAUST). This turbine outlet temperature ("TOT") is measured with a temperature transducer ("TT"). Such routine can be modified as needed to take into account cooling flows to the turbine and the lowering of the TOT from such flows so as to avoid significant under-predicting of the TIT.

A third routine for calculating TIT can make an estimation based upon the measured temperature of the turbine casing or the wheel space. Such routine can include the use of a BIAS, or off-set, to allow for direct measurement of metal temperatures in the turbine (INNER CASING) via a temperature transducer ("TT").

As the above three routines are executed, the control system takes the higher of the three calculations [>H] and uses it to form an output signal TIT-CALC. This output is sent to the further control pathways as needed, such as in FIG. 2, as described above.

In some embodiments, TIT may not be directly controlled but rather may be dependent on the combination of turbine outlet temperature (TOT) and actual turbine power. In particular, the DCS can be configured to control TOT by controlling mass flow into the turbine. This can be adapted to control the temperature profile in the primary heat exchangers, limit thermo-mechanical fatigue in the piping and heat exchangers, and control rate of temperature change during start-up and shut-down. The TCS therefore can control turbine power output by controlling the fuel flow. Because TIT may not be directly controlled, it can be necessary to monitor TIT for safety purposes.

In some embodiments, a fuel control path may be adapted to provide a substantially linear response to changes in flow. As such, a multi-valve configuration may be utilized wherein the fuel control path includes one or more fuel flow control valves as well as one or more fuel pressure control valves. A pressure control valve may be utilized to control the pressure drop across a downstream fuel flow control valve or may be utilized to control the pressure in front of a downstream fuel flow control valve. These (and other control points) can be used to linearize the fuel flow control valve response to enable more linear and predictable controls and also to separate the fuel flow control valve from the pressure fluctuations in upstream pressure in the fuel supply system.

A control path including fuel pressure control valves as noted above is illustrated in FIG. 4j (SHEET 10). As seen therein, signal generators can be included in the control paths for both the flow control valve of the high flow FCV-FH (element 232 in FIG. 2) and the flow control valve of the low flow FCV-FL (element 246 in FIG. 2). In each case, a pressure set point can be established so that the pressure drop across the respective FCV is held at a defined pressure, which can be minimum pressure set point (i.e., "XX bar"). A corresponding valve stroke percentage can also be set for the high flow and for the low flow (where "XX %" indicates the variable valve stroke percentage) so that when the valve stroke set point is reached, the set point of the pressure drop rises in order to increase fuel delivery. This is seen with the % bar f(x) function and the high select (>H) function in each line. Such control path configuration can provide for automatic operation regardless of the power plant mode (e.g., start-up versus full operation).

In addition to the above, one or more pressure transducers can be included in a control path so as to hold the lowest pressure drop across a pressure control valve at a fixed value. In FIG. 4j (SHEET 10), three pressure transducers are utilized to provide pressure signals related to the PRESSURE UPSTREAM OF FCV-FH, the fuel gas compressor discharge pressure, or FG COMP DISCHARGE, and the PRESSURE UPSTREAM OF FCV-FL. A logic sequence can be utilized so as to select the lowest of the three measured pressures [>L]. The controller thereafter generates a value for the fuel gas compressor exhaust pressure (FG PRES SET POINT) based on this lowest pressure drop and delivers the signal to the DCS. Calculation of flows though PCV-FH and PCV-FL also considers the PRESSURE DOWNSTREAM OF FCV-FH and the PRESSURE DOWNSTREAM OF FCV-FL, respectively, each of which is measured by respective pressure transducers. These provide actual stream flow pressure values that are compared against the minimum values as discussed above.

In some embodiments, only a single pressure drop may be utilized. For example, during start-up, it is possible to only use the pressure drop across PCV-FL. Preferably, a minimum setting is utilized based upon the minimum compressor performance rating. This minimum pressure (e.g., "min bar") is input through a signal generator, and the highest of the pressures is selected as noted by a high select function [>H]. Utilization of one or more pressure control valves upstream of the fuel flow control valves can, in some embodiments, provide for maintenance of constant fuel gas pressure control solely through varying pressure output from the fuel gas compressor. Again, special considerations can be provided during start-up mode. For example a signal generator can be used to force a pressure control valve to 0% during start-up to ensure that the valve stays closed and that there is no pressure in the high fuel line between the PCV and the FCV. At the appropriate time, a READY TO MODE SW signal can indicate a change from a start-up mode to a full function mode, and this signal can cause a signal generator to open the PCV-FH valve to a predetermined setting (Y %). Necessary switching is carried out utilizing automatic switches ("ASW"). When the change from start-up mode to normal operation mode occurs, the pressure drop across the valve is controlled normally as noted above.

Figure 3:
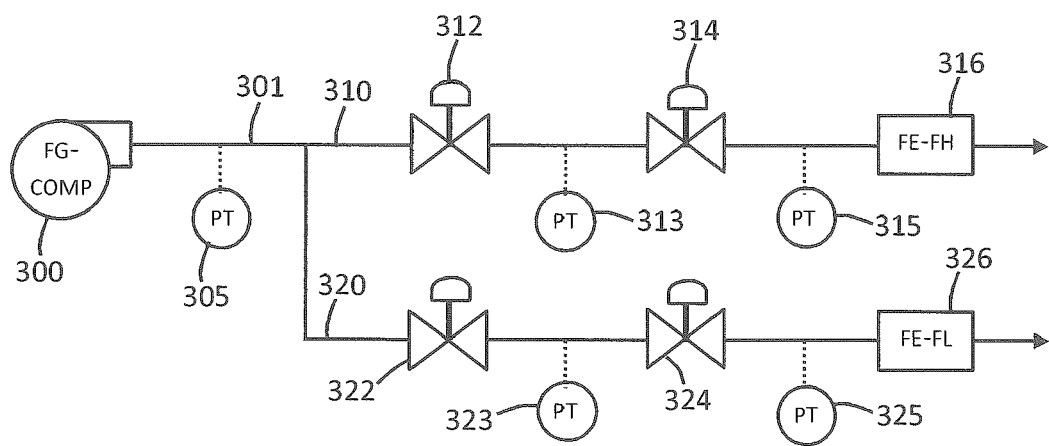
FIG. 3 is a flow diagram for a fuel gas system and certain control elements therefor as used in a power production plant according to embodiments of the present disclosure.

A simplified diagram of the fuel gas system for a power plant according to the present disclosure is shown in FIG. 3. As seen therein, the main fuel line 301 leaving a fuel gas compressor 300 splits into a primary or high line 310 and a secondary or low line 320. The high fuel line 310 includes a pressure control valve 312, a flow control valve 314, and a flow sensing element 315. A pressure sensor 313 is positioned between the pressure control valve 312 and the flow control valve 314, and a pressure sensor 315 is positioned between the flow control valve 314 and the flow sensing element 316. The low fuel line 320 likewise includes a pressure control valve 322, a flow control valve 324, and a flow sensing element 325. A pressure sensor 323 is positioned between the pressure control valve 322 and the flow control valve 324, and a pressure sensor 325 is positioned between the flow control valve 324 and the flow sensing element 326. A pressure sensor 305 is also positioned in the main fuel line 301 upstream of the split between the high line 310 and the low line 320. In certain embodiments, valve 312 can correspond to PCV-FH, valve 314 can correspond to FCV-FH, valve 322 can correspond to PCV-FL, and valve 324 can correspond to FCV-FL. With reference to FIG. 3 and to FIG. 4j (SHEET 10), PT 305 can measure FG COMP DISCHARGE, PT 313 can measure PRESSURE UPSTREAM OF FCV-FH, PT 315 can measure PRESSURE DOWNSTREAM OF FCV-FH, PT 323 can measure PRESSURE UPSTREAM OF FCV-FL, and PT 325 can measure PRESSURE DOWNSTREAM OF PCV-FH.

In addition to providing specific control over fuel flow to the combustor, the control systems of the present disclosure can be configured to control various aspects of the oxidant flow to the combustor. As illustrated in FIG. 4k (SHEET 11), the control system can include pathways adapted to maintain the pressure drop through the oxygen low flow control valve (FCV-OL POSITION) at a defined value. A pre-set percentage can be provided via a signal generator (SG-XX %), and any percentage can be chose as the maximum percentage. This maximum is compared against the actual flow through the FCV-OL as input by the TCS. The control path also includes a signal generator for input of a minimum flow pressure that can be pre-set as desired (SG-BB bar), and a high select (>H) function is used to send the required value to the next control pathway. The control system can be configured to increase the set point for the pressure drop through the FCV-OL. This change in set point can signal a change in the oxidant pressure set point (OX PRES SET POINT) sent to the DCS, which signal is used for control pathways in relation to the compressors and/or pumps used in the power plant. This allows for smooth and continuous control in the various operating modes. The ability to satisfy the oxidant pressure set point is dependent upon coordination of the oxidant compressor and the oxidant pump in relation to a COMBUSTOR PRESSURE value from a pressure transducer PT and the OXIDANT DELIVERY PRESSURE value from a pressure transducer PT. When the pump is to be brought online, the DCS can be adapted to notify the TCS to hold the fuel signal since the oxidant flow is dependent upon the fuel signal. In this manner, the oxidant pressure control system is simplified, is aligned with the fuel flow, and becomes automatic.

As seen from the foregoing, the present control systems can be configured so that power demand is controlled by fuel input. In particular, the TCS can control fuel input in order to meet the POWER DEMAND signal. Combinations of flow control valves and pressure control valves can be automatically controlled and provide smooth control and operation across the needed range of controls for turbine operation. The resulting power cycle is thus less responsive to changes in fuel input that in conventional gas turbines. According to the present disclosure fuel control changes are more forgiving since less precision is required, and a slower response time can increase operation safety.

Figure 5:
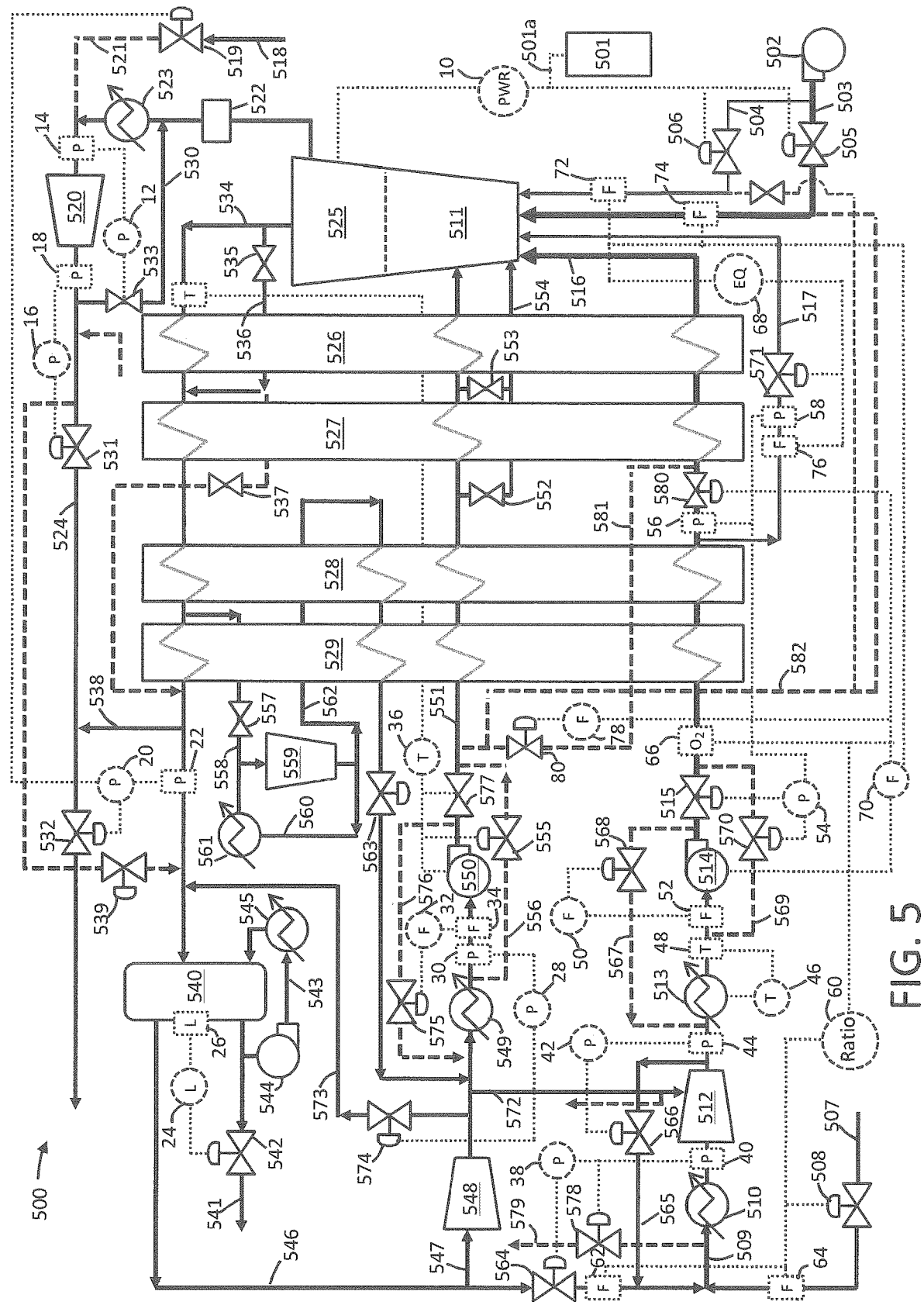
FIG. 5 shows a flow diagram including a plurality of functional components and control elements for a power production plant according to embodiments of the present disclosure.

In some embodiments, various control paths may be utilized in relation to cooling of the turbine. For example, automated control may be provided so that one or more cooling streams, such as a portion of the recycle $CO_2$ stream, may be directed to the turbine for cooling, and control paths may be utilized to control one or more of mass flow, pressure, temperature, and source of the cooling streams. In some embodiments, $CO_2$ streams can be withdrawn from one or more positions in the re-heating path through the recuperator heat exchanger (e.g., element 35 in FIG. 1). Referring to FIG. 4l (SHEET 12), two alternative control paths are illustrated: a temperature biased flow control in the upper path and an individual control scheme in the lower path. In the upper control path, a mass flow set point for blade cooling flow (BLD COOL FLOW SP) can be set by the TCS and used to control two cooling valves at two different temperature ranges—BLADE COOLING COLD VALVE and BLADE COOLING HOT VALVE (although more or fewer valves can be used) based upon the differential (Δ) against the actual measured BLADE COOLING FLOW provided by the BLADE COOLING FLOW flow transducer ("FT"). The differentiation between "cold" and "hot" references the relative temperatures at which the $CO_2$ streams are withdrawn from the heat exchanger. For example, the BLADE COOLING HOT VALVE is illustrated in FIG. 5 as valve 553, and the BLADE COOLING COLD VALVE is illustrated in FIG. 5 as valve 552. As an example, a flow control element may be included in communication with valve 552, and a temperature control element may be included in communication with valve 553. The temperature control element can be configured to bias the control signals that are sent to the BLADE COOLING flow control valves to maintain temperature control. In the control path, a blade cooling temperature set point (BLD COOL TEMP SP) can be provided via the TCS, and compared against the actual BLADE COOLING TEMP measured by a temperature transducer ("TT"). To set defined tolerances, a maximum allowed temperature can be input via a signal generator (SG MAX ° C.), and a low select (>L) function can be used to compare the maximum temperature against BLD COOL TEMP SP. The selected value passes to a high select (>H) function to be compared against a minimum allowed temperature that is input via a signal generator (SG MIN ° C.). The final value is compared in the differential function ($\Delta$) against the BLADE COOLING TEMP.

In the lower control path, the hot cooling valve (BLADE COOLING HOT VALVE) is used to control flow entering the blade cooling line based upon a comparative routine between the BLD COOL FLOW SP input from the TCS and the BLADE COOLING FLOW from a flow transducer ("FT"). As before, the cooling temperature set point (BLD COOL TEMP SP) is compared against the measured BLADE COOLING TEMP from a temperature transducer ("TT"), including the tolerance checks, and the differential is used to control the BLADE COOLING COLD VALVE. As seen from the foregoing, the control system can be particularly adapted to hold or lower the mass or volume of fuel flowing through at least one of the fuel flow lines from the fuel supply system to the combustor in order to protect one or more of the heat exchangers from overheating. The control function can be in response to an input signal indicating an operating temperature of a heat exchanger is approaching or exceeding the predefined operating maximum temperature or rate of heat increase.

Various control paths particularly can be utilized in start-up of the power production plant, including using coordinated routines between the TCS and the DCS. As such, the present disclosure particularly can relate to methods and controls for start-up of a power production plant. Start-up procedures particularly can rely upon coordinated controls of fuel flow and oxidant flow as the combustor and turbine are brought online. Exemplary control paths related to the initiation of plant startup are shown in FIG. 4b (SHEET 2). In such embodiments, the DCS will send a PREPARE TO START signal after ensuring that plant wide systems are ready. The TCS will enable and start any necessary subsystems needed for start-up and ignition—START EHC (electrohydraulic control); START LUBEOIL; START LCI (load commutated inverter); START OTHERS. These start signals correlate to ready signals that can initiate turning of the main shaft (START TURN GEAR) and initiate the FUEL PURGE SEQ (sequence) to ensure that any fuel is purged from the lines prior to initiating ignition of the combustor. Additional READY signals may be required as permissives prior to these initiations—LUBEOIL READY; LCI READY; OTHERS READY; EHC READY. As a specific example, LUBE OIL pressure can be read from a pressure transducer (PT) to confirm that a minimum pressure ("min P") has been achieved. The control path next can include a required input from the TCS indicating that the actions for purging fuel from the system is complete (PURGE COMPLETE signal) and a required reading that the SHAFT SPEED has achieved a minimum range ("min rpm"). At this point, a READY TO START signal can be initiated by the DCS.

Figure 4C:
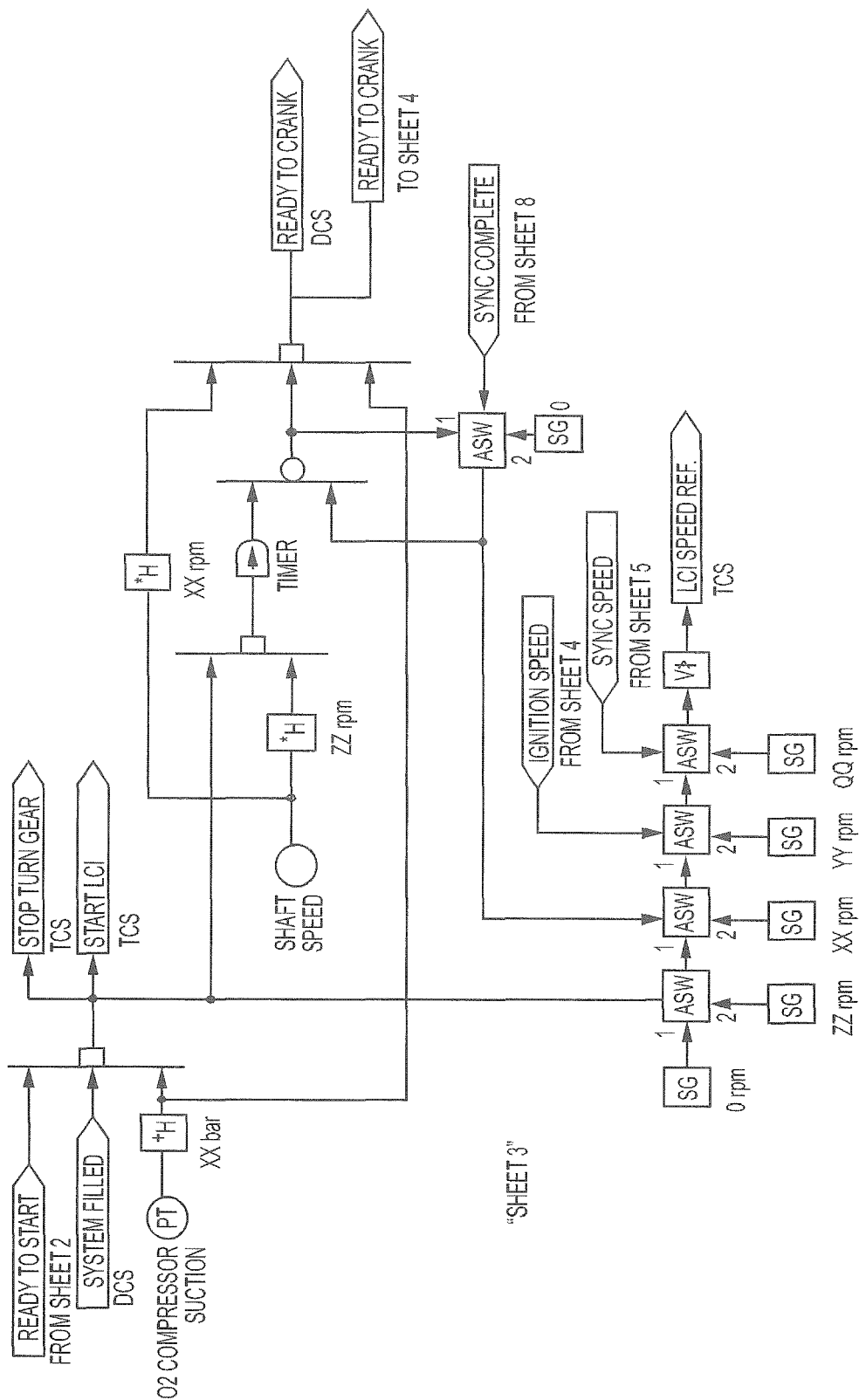
FIG. 4c is SHEET 3 of the series of function block diagrams, FIG. 4c showing control paths useful in, for example, initiating turbine crank and load commutated inverter (LCI) reference during start-up of a power production plant according to embodiments of the present disclosure.

Additional control pathways useful in controlling start-up of the power plant are illustrated in FIG. 4c (SHEET 3). As seen therein, the start-up controls can include a requirement for a fill signal indicating that the necessary lines are filled with working fluid (e.g., $CO_2$). A SYSTEM FILLED signal from the DCS must be combined with a READY TO START signal that can be generated as described above for start-up to continue. Other permissive signals may also be required. As illustrated, $CO_2$ COMPRESSOR SUCTION as measured by a pressure transducer (PT) must meet a variable minimum pressure requirement ("XX bar"). Fulfillment of these requirements can signal the TCS to take the main shaft off of the turning gear (STOP TURN GEAR signal) and place it under LCI control (START LCI signal). The LCI can be controlled according to a plurality of signal generators (SG) set to 0 rpm or a variable rpm (shown as "ZZ" rpm, "XX" rpm, "YY" rpm, and "QQ" rpm) and automatic switches (ASW) to ensure that the turbine ramps up according to pre-defined set points that can include automatic adjustments of rotation speed based upon a signal confirming speed synchronization between the compressor and the turbine (SYNC SPEED), a signal confirming that the speed necessary for ignition of the combustor is met (IGNITION SPD), and a signal confirming synchronization of certain system components (SYNC COMPLETE 8). Confirmation of the various turbine speed set points prompts delivery of a LC SPEED REF. signal to the TCS. When the main shaft is turning at the predefined speed (ZZ rpm), a timer is activated. After time rundown is complete and the turbine speed set points have been met, a READY TO CRANK signal is generated and sent to the DCS and is used in further pathways to continue with switching to full operation of the power plant.

Figure 4D:
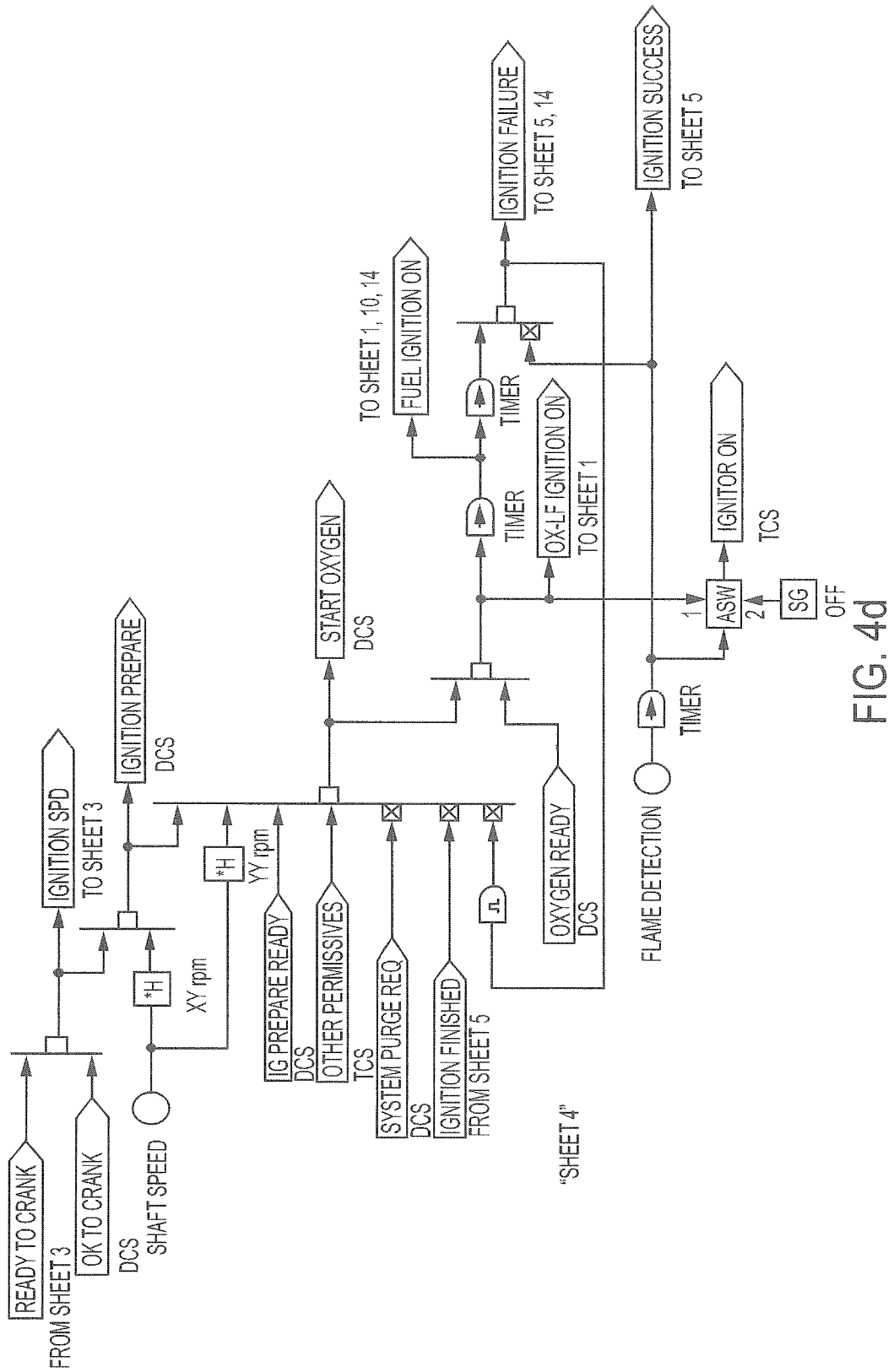
FIG. 4d is SHEET 4 of the series of function block diagrams, FIG. 4d showing control paths useful in, for example, cranking and ignition during start-up of a power production plant according to embodiments of the present disclosure.

Still further control pathways useful in controlling start-up of the power plant are illustrated in FIG. 4d (SHEET 4). As seen therein, the start-up control path requires receipt of the READY TO CRANK signal discussed above and an OK TO CRANK signal from the DCS in order for the turbine to be accelerated to the ignition speed. While measured shaft speed is still below the ignition speed, the TCS sends the DCS the IGNITION PREPARE signal, and the DCS responds by activating further elements of the power production plant in the ignition pre-sets. The OXYGEN READY signal is next received from the DCS, and the TCS responds by sending the START OXYGEN signal to the DCS so long as further requirements are met: 1) the shaft speed is at the ignition value, which can pre-set as desired (YY rpm); 2) the DCS responds with an ignition ready signal (IG PREPARE READY) after the IGNITION PREPARE signal; 3) any other permissive signals (OTHER PERMISSIVES) are present; 4) there is confirmation that a system purge is not required—i.e., SYSTEM PURGE REQ is negative; and 5) there is confirmation that the ignition sequence has not finished—i.e., IGNITION FINISHED is negative. Upon receipt of the OXYGEN READY signal and the START OXYGEN signal from the DCS, the DCS initiates the ignition sequence. A fuel delay timer is next activated, and the low flow fuel valve (FCV-FL) is opened to a predetermined position. This allows time for the oxidant lines to fill so that fuel and oxidant are introduced to the combustor at substantially the same time. The control system thereafter delivers a plurality of signals for use in further control pathways. When the ignition sequence begins, the signal for the ignition system is to the TCS (IGNITOR ON), and a timer for fuel initiation is started. Fuel initiation starts a second timer for ignition detection. A return loop can be included so that an ignition failure will reset the ignition sequence. If ignition is not detected before the timer signal expires, the IGNITION FAILURE signal is sent. The signal can be held at a high value for a set time to allow the DCS the time needed to process and set the SYSTEM PURGE REQ signal and pause re-ignition attempts if needed. FLAME DETECTION must persist for the duration of a pre-set timer before the ignition signal will pass so as to eliminate flame sputtering. The ignition detection system will deactivate the ignitor when ignition is detected, and the IGNITION SUCCESS signal is sent to further control pathways.

Figure 4E:
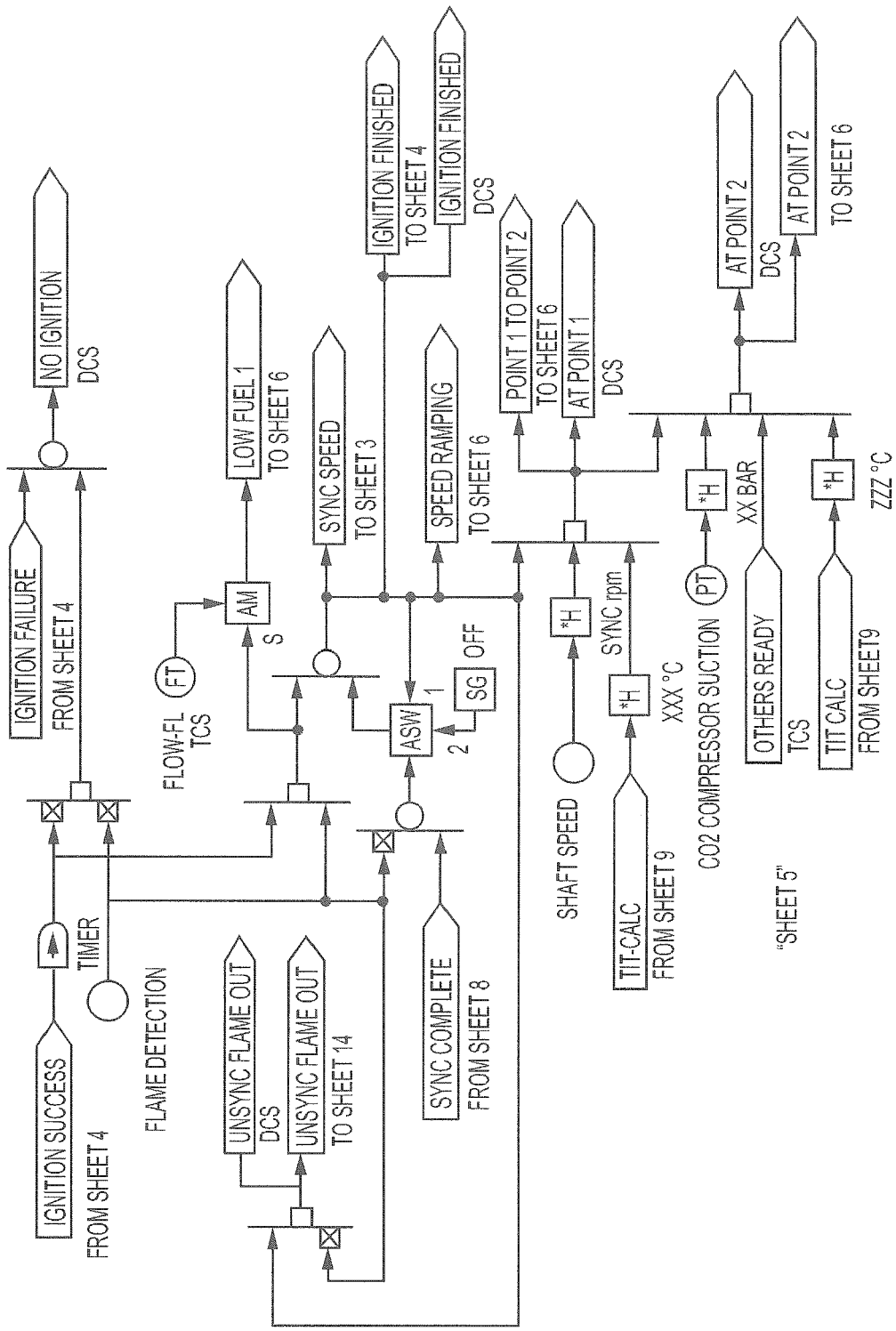
FIG. 4e is SHEET 5 of the series of function block diagrams, FIG. 4e showing control paths useful in, for example, ignition during start-up of a power production plant according to embodiments of the present disclosure.

As seen in FIG. 4e (SHEET 5), the IGNITION SUCCESS signal is used in control pathways adapted for controlling pressure through the system while transitioning from start-up to full operation. The control pathways can be adapted, for example, to keep pressure in the system low during start-up. The AT POINT 1 signal sent to the DCS, for example, can correlate to the compressor being at a pressure of about 10 bar. The control system then brings pressure up once the compressor is functioning as full speed. The AT POINT 2 signal, for example, can correlate to the compressor being at a pressure of about 30 bar.

Figure 4F:
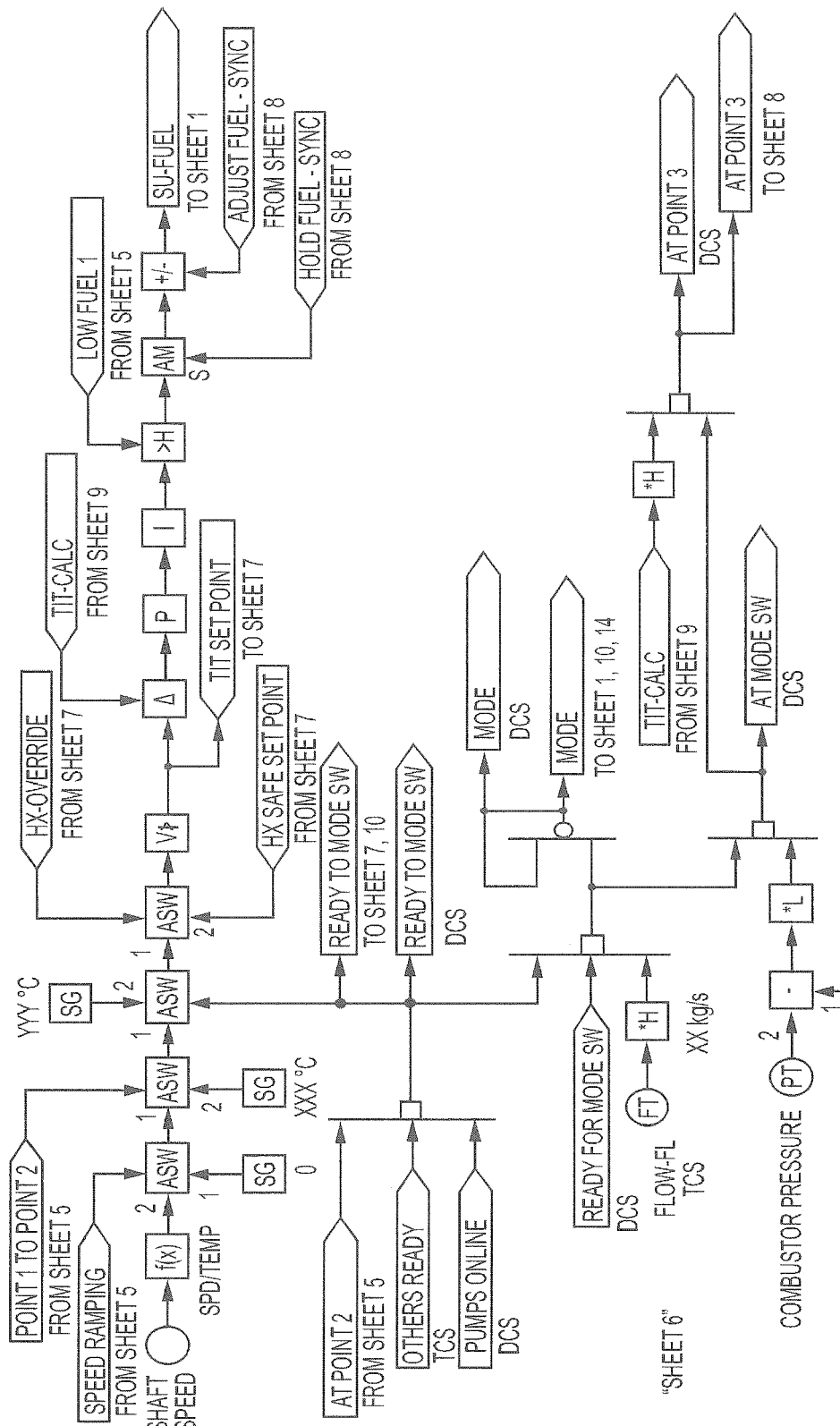
FIG. 4f is SHEET 6 of the series of function block diagrams, FIG. 4f showing control paths useful in, for example, meeting fuel demand during start-up of a power production plant according to embodiments of the present disclosure.
Figure 4I:
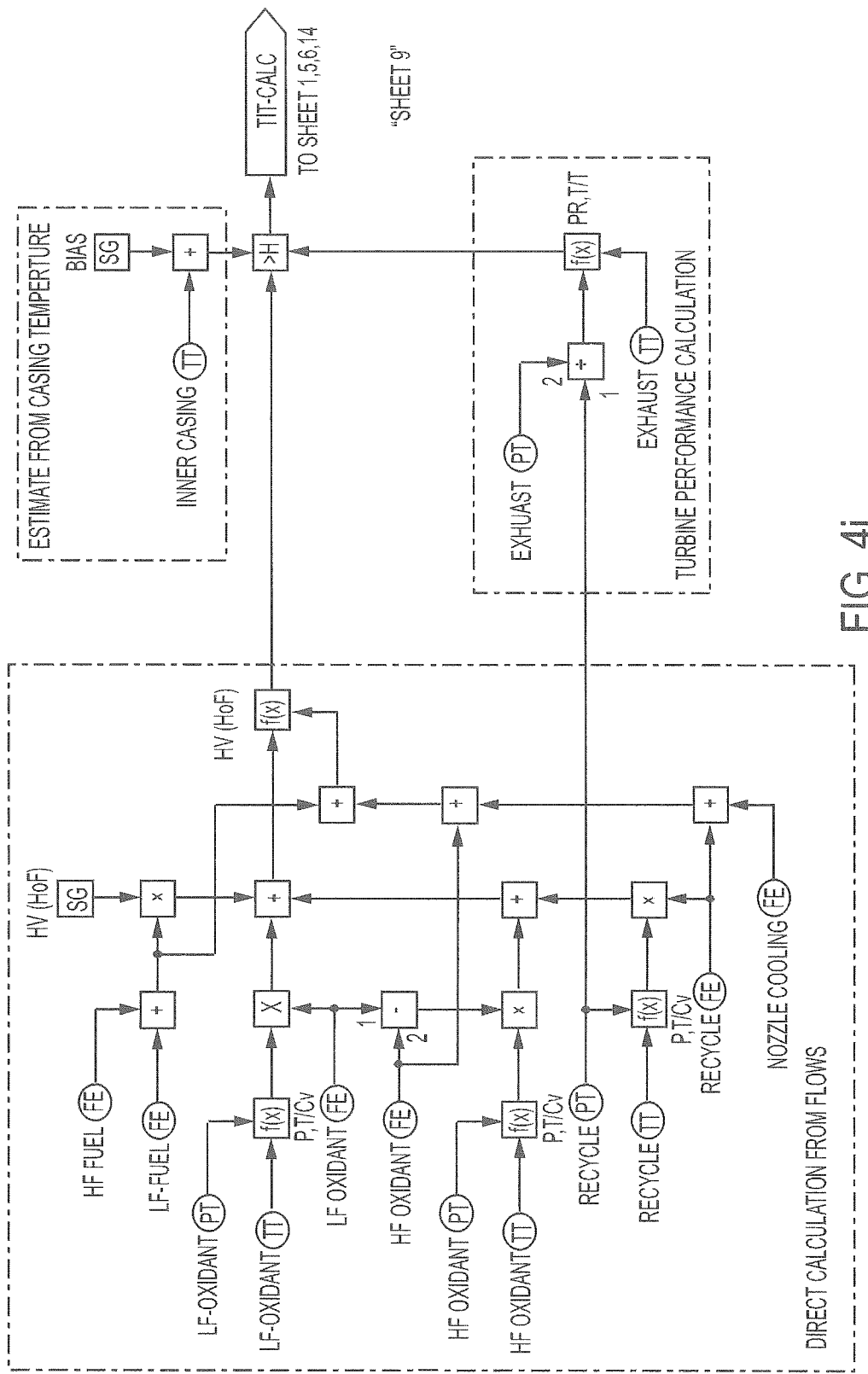
FIG. 4*i* is SHEET 9 of the series of function block diagrams, FIG. 4*i* showing control paths useful in, for example, calculating turbine inlet temperature in a power production plant according to embodiments of the present disclosure.
Figure 4J:
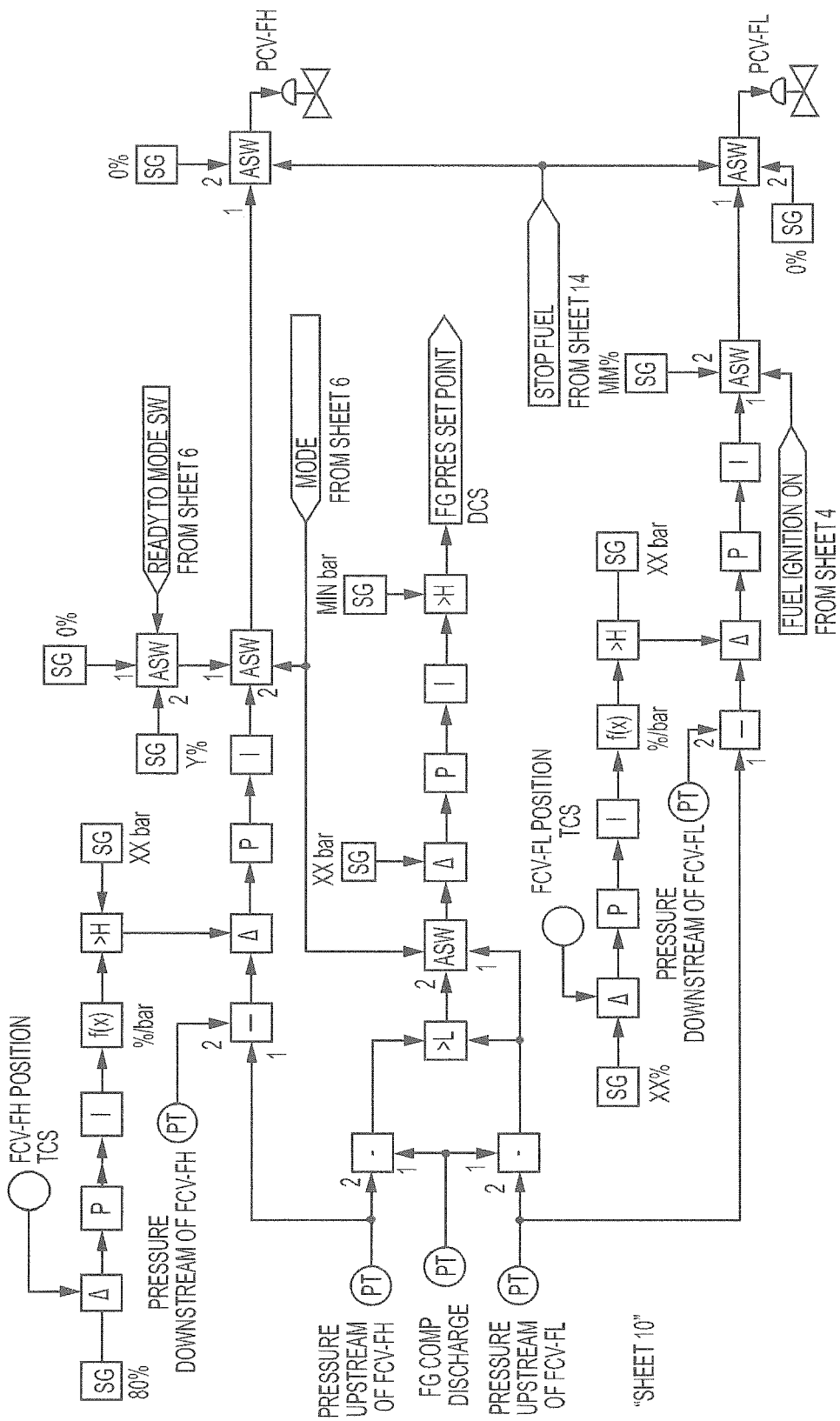
FIG. 4*j* is SHEET 10 of the series of function block diagrams, FIG. 4*j* showing control paths useful in, for example, controlling fuel pressure control valves and discharge pressure set points in a power production plant according to embodiments of the present disclosure.
Figure 4K:
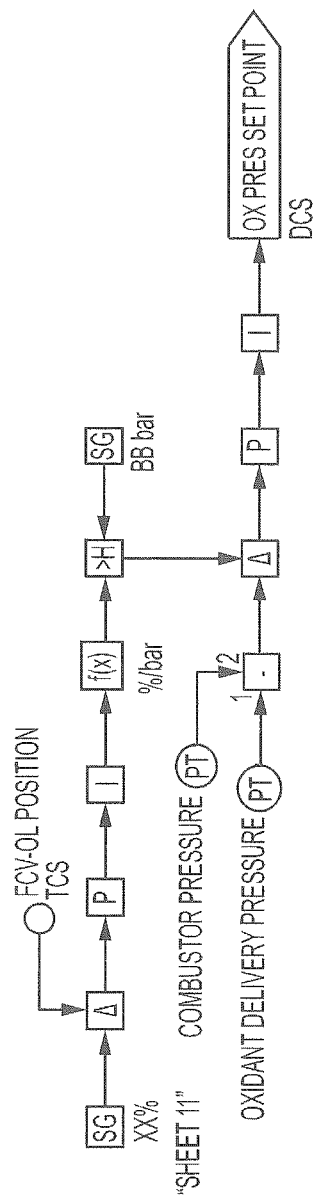
FIG. 4*k* is SHEET 11 of the series of function block diagrams, FIG. 4*k* showing control paths useful in, for example, establishing oxidant discharge pressure set point in a power production plant according to embodiments of the present disclosure.
Figure 4I:
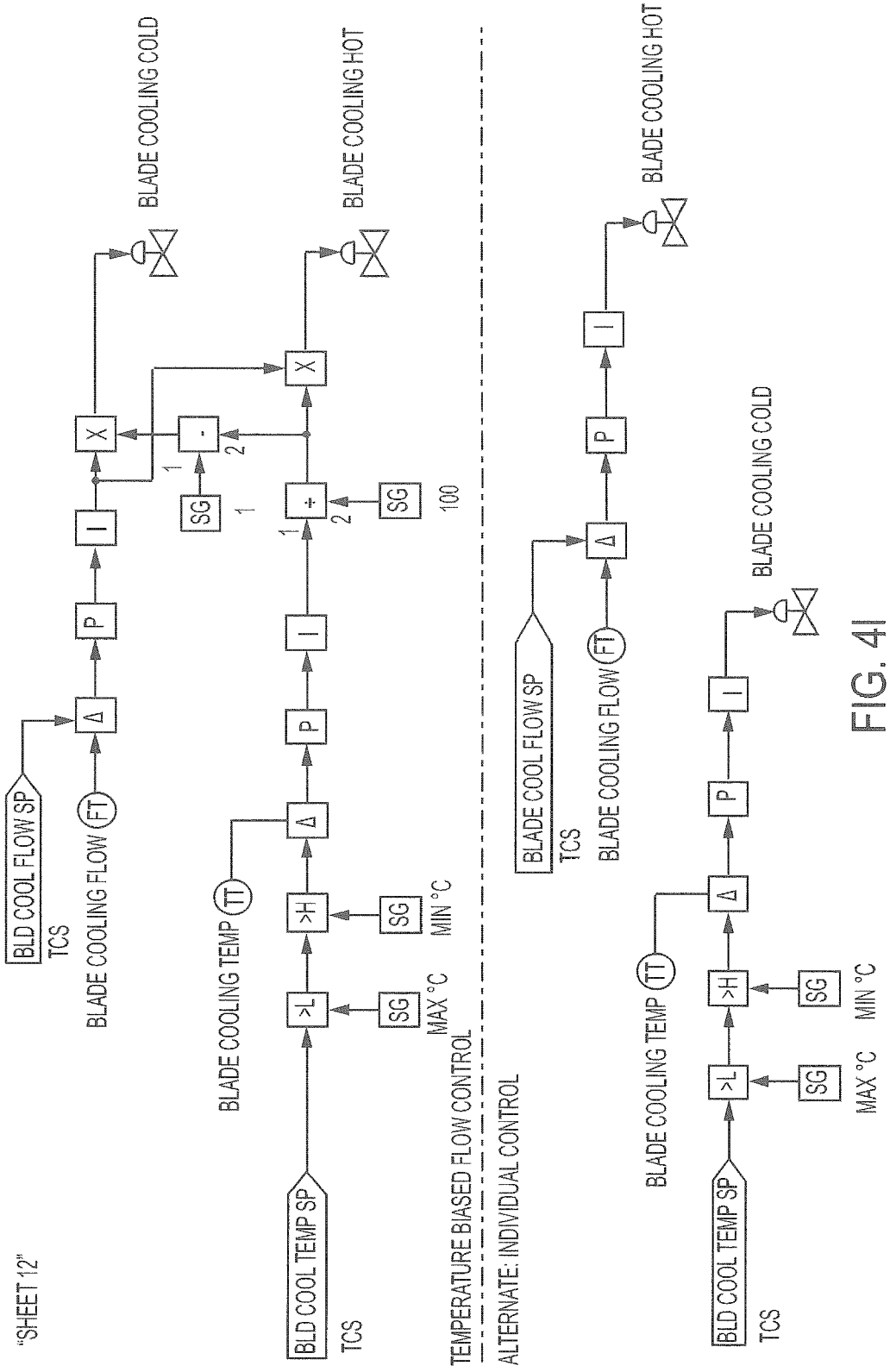
Figure 4M:
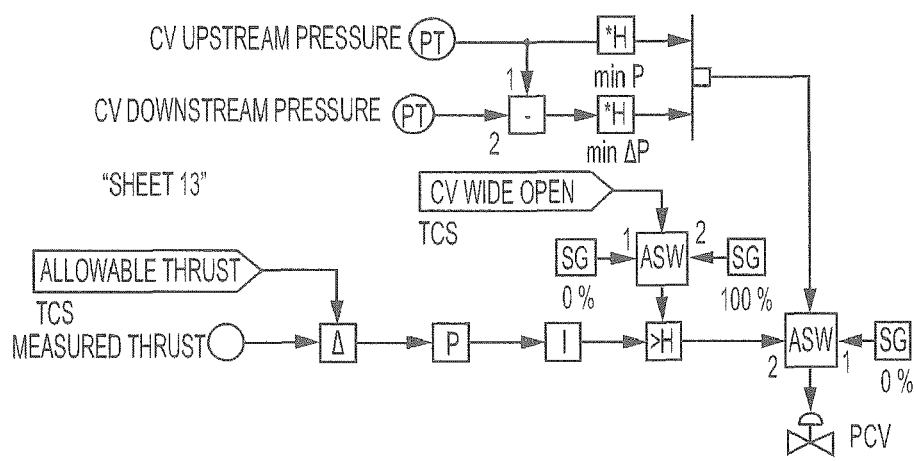
FIG. 4*m* is SHEET 13 of the series of function block diagrams, FIG. 4*m* showing control paths useful in, for example, turbine thrust control in a power production plant according to embodiments of the present disclosure.

FIG. 4f (SHEET 6) and FIG. 4h (SHEET 8) illustrate still further control paths showing way points along the start-up routine. For example, in SHEET 6, the control system utilizes various signals that, among other actions, can change fuel flow in connection with acceleration of the turbine up to a full operation speed. SHEET 8 illustrates interaction of the Generator Control System (GCS) with synchronization of the various systems while transitioning from start-up to full operation. FIG. 4m (SHEET 13) illustrates control pathways for controlling turbine thrust by comparing measured values against an ALLOWABLE THRUST signal received from the TCS. Additional control pathways can be provided for ensuring safe operation, as illustrated in FIG. 5n (SHEET 14). For example, the control system can be adapted to initiate the STOP FUEL signal in response to receiving further signals indicating that ignition failed and/or previous ignition has encountered flameout—i.e., UNSYNC FLAMEOUT; IGNITION FAILURE; and SYNC FLAMEOUT signals. Initiation of the STOP FUEL signal can also initiate opening of various valves and vents so that fuel and/or oxidant in the lines can be safely vented.

Figure 4N:
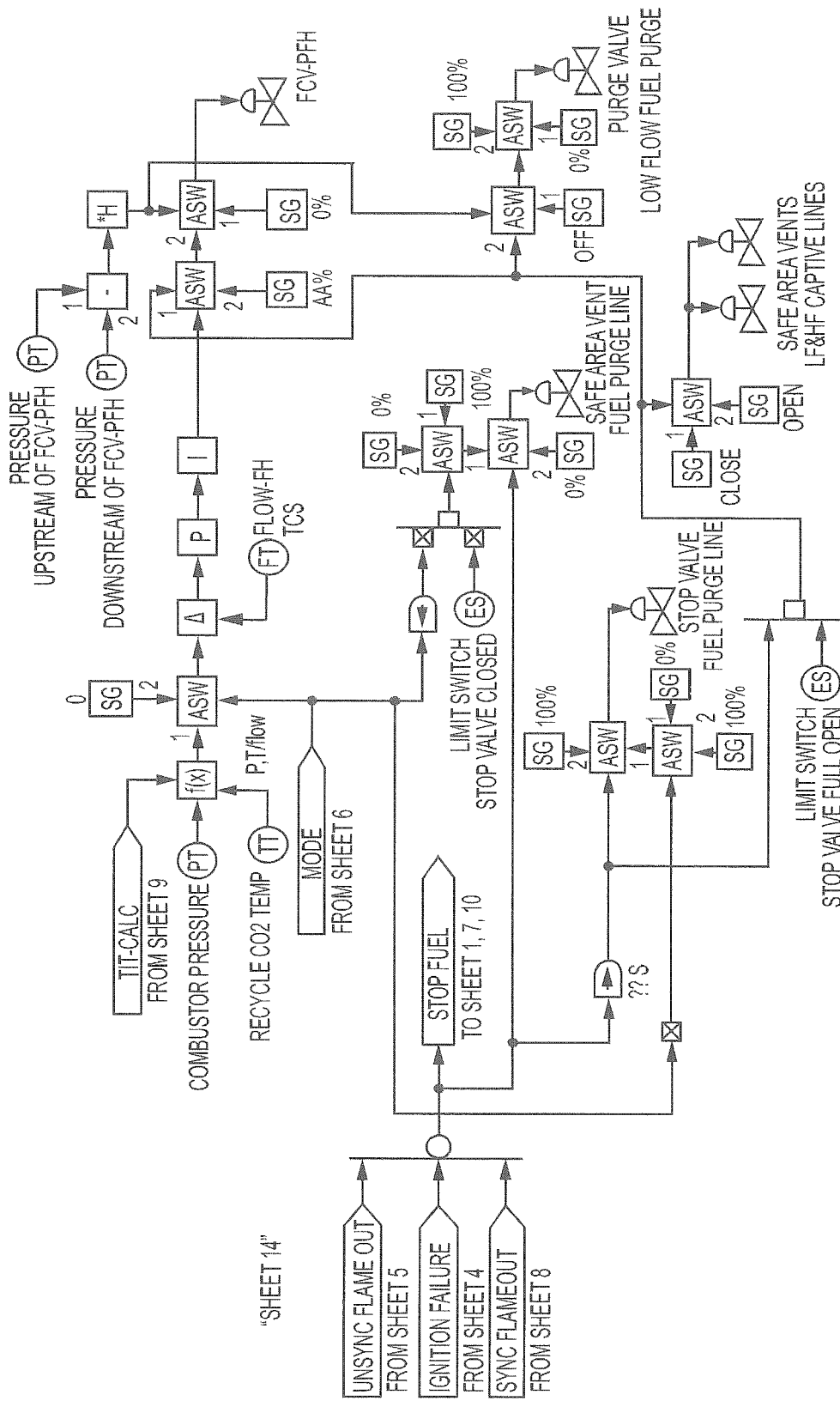
FIG. 4*n* is SHEET 14 of the series of function block diagrams, FIG. 4*n* showing control paths useful in, for example, controlling fuel line purge flows in a power production plant according to embodiments of the present disclosure.

Further to the foregoing description, reference to SHEET 1 through SHEET 14 in FIG. 4a through FIG. 4n is provided to illustrate exemplary control paths that may be utilized according to embodiments of the present disclosure and for ease of reference for signals originating in one flow path that are used as inputs in another flow path. Each of the respective flow diagrams may be viewed individually and, as such, aspects of the present disclosure can be defined in relation to all or part of a single flow diagram in one of said SHEETS. In other embodiments, the respective flow diagrams may be read in combination and, as such, aspects of the present disclosure can be defined in relation to combinations of all or part of two or more of said SHEETS. In other words, one or more elements from any one of SHEET 1 through SHEET 14 (FIG. 4a through FIG. 4n) may be combined with one or more elements of any other of SHEET 1 through SHEET 14 (FIG. 4a through FIG. 4n). Possible combinations of the various flow diagrams will be apparent based on the further disclosure provided herein.

In FIG. 4a through FIG. 4n, various symbols have universal meanings. Banner boxes with a single pointed end represent signals that are input to a control pathway or are output by a control pathway. Various function calculation boxes have the generally recognized meaning in the art. Boxes with the "Δ" signal indicate that a differential is calculated based on the inputs. Boxes with "f(x)" indicate a calculation function is being carried out. Boxes with "P" or "I" indicate "proportional" and "integral", respectively. Although only "P" and "I" boxes are shown, it is understood that the illustrated control pathways can utilize a typical control loop feedback mechanism wherein a "PID" controller (proportional, integral, derivative) calculates an error value as the difference between a desired setpoint and a measured process variable and applies a correction based on proportional, integral, and derivative terms. Thus, any or all of P, I, and D may be used according to the present disclosure. Boxes with a "+", "−", "×", or "÷" symbol indicate the addition to values, subtraction of values, multiplication of values, and division of values, respectively. Boxes with "ASW" indicate the presence of an automatic switch. Boxes with "SG" indicate a signal generator where pre-defined input value is generated, which signal may have a specific value (represented by a number by the box) or may have a variable value (indicated by a generic value indicator—e.g., "xx", "nn", etc.). Boxes with "AM" indicate a value being stored in an analog memory component. Boxes with >H or >L indicate a selection of the highest of the input values or the lowest of the input values, respectively. Boxes with inputs numbered "1" and "2" indicate that the "1" input is used until a third (non-numbered) input is received, at which time the number "1" input is superseded by the number "2" input. Boxes with "*H" indicate a high pass wherein the signal is only present if the actual input exceeds the set value. Boxes with "*L" indicate a low pass wherein the signal is only present if the actual input is less than the set value. The use of circles instead of boxes indicates an input from a sensor.

Applications of various control pathways in control of power production systems and methods according to the present disclosure are illustrated in FIG. 5. As seen therein, a power generation system 500 comprises a plurality of components configured for combustion of a fuel with oxygen at high pressure to form a combustion stream that is expanded across a turbine, cooled, purified, and recycled back to the combustor as a working fluid. The power generation system 500 includes a main control system 501 that is in a working connection through communication line 501a with a plurality of further communication lines as described in greater detail below. A single control system 501, as illustrated, may be a DCS as otherwise described here, a TCS as otherwise described herein, a GCS as otherwise described herein, or any further general control system suitable for reading inputs and providing outputs for control of a power production method carried out with a power production system 500 as illustrated. It is understood that a plurality of control systems may be utilized, and only a single control system 501 is illustrated for simplicity. The control system 501 further may be considered to encompass a plurality of separate control systems, such as any combination of a DCS, TCS, and GCS.

In practice of a power production method according to the present disclosure, a fuel (e.g., methane, syngas, or other gaseous fuel from a fuel source—see element 115 in FIG. 1) is compressed in a fuel gas compressor 502, and the compressed fuel can be passed through one or both of a primary fuel line 503 (or a high flow fuel line) and a secondary fuel line 504 (or a low flow fuel line) to a combustor 511. Flow through the primary fuel line 503 and the secondary fuel line 504 can be controlled through automated opening and closing of a high flow fuel control valve 505 (e.g., FCV-FH) and a low flow fuel control valve 506 (e.g., FCV-FL), respectively. The primary fuel line 503 can be a large capacity line relative to the secondary fuel line 504, and the majority of fuel flow to the combustor during full operation of the power production system 500 can be through the primary fuel line. While fuel may also flow through the secondary fuel line 504 during full operation, this line may be used mainly during start-up of the power production system 500 as otherwise described herein.

Oxidant from an oxidant supply (e.g., element 120 in FIG. 1) can flow through main oxidant line 507, which can be controlled via a valve 508. The oxidant (which can be a stream of substantially pure oxygen from an air separation unit, for example) is combined with recycled $CO_2$ from stream 546 to form a diluted oxidant stream in line 509, which is passed through a heat exchanger 510 and then compressed in oxidant compressor 512. The compressed diluted oxidant stream is next cooled in heat exchanger 513 and pumped through pump 514 and valve 515. The compressed oxidant stream is then heated sequentially by passage through recuperator heat exchangers 519, 528, 527, and 526 before being passed to the combustor 511 in primary oxidant line 516. A fraction of the compressed diluted oxidant stream can be drawn off to be passed to the combustor 511 in secondary oxidant line 517 through valve 571. Between the oxidant compressor 512 and the heat exchanger 513, a portion of the diluted oxidant can be drawn off in line 565 through valve 566 for recirculation to the line exiting valve 564 and ultimate passage back into line 509. Optionally, a portion of the diluted oxidant stream between pump 514 and valve 515 can be drawn in line 567 through valve 568 for recirculation to line 509 between compressor 512 and heat exchanger 513. Also optionally, a portion of the diluted oxidant stream between valve 515 and recuperator heat exchanger 529 can be drawn in line 569 through valve 570 for recirculation to line 509 between heat exchanger 513 and pump 514.

Fuel from primary fuel line 503 and/or secondary fuel line 504 is combusted in the combustor 511 with oxidant through primary oxidant line 516 and/or secondary oxidant line 517 to produce a high pressure (e.g., in the range of about 100 bar to about 500 bar, preferably about 150 bar to about 400 bar) and high temperature (e.g., in the range of about 400° C. to about 1500° C., preferably about 600° C., preferably about 600° C. to about 1200° C.) combustion product stream that is expanded in turbine 525 to a pressure that is less than the combustion pressure and preferably is less than the supercritical pressure of $CO_2$ (e.g., about 1 bar to about 75 bar). A stream of $CO_2$ may also be introduced in line 518 through valve 519 for passage to the gland seal compressor 520 through line 521 (which is illustrated in dashed line to indicate an optional flow). A fraction of the turbine exhaust is passed through gland seals 522. The stream thereafter is cooled in heat exchanger 523 before being passed to the gland seal compressor 520. The stream exiting the gland seal compressor 520 may be vented through line 524 or may be recirculated to a point upstream of heat exchanger 523 in line 530. Passage through line 524 is controlled with valves 531 and 532, while passage through recirculation line 530 is controlled with valve 533. Further configurations related to gland seals and associated components in a power production system are described in U.S. Pat. Pub. No. 2016/0363009 to Fetvedt et al., the disclosure of which is incorporated herein by reference.

The main turbine exhaust stream exits the turbine 525 in line 534 to be passed sequentially through recuperator heat exchangers 526, 527, 528, and 529. A side stream may be drawn off from line 534 through valve 535 and pass in line 536 through recuperator heat exchanger 526 before being rejoined with line 534. Optionally, part or all of the stream in line 536 may be drawn through valve 537 to rejoin with turbine exhaust in line 534 downstream of recuperator heat exchanger 529. Further, a portion of the turbine exhaust in stream 534 may be passed through line 538 to vent line 524. Optionally, a portion of the turbine exhaust from gland seal compressor 520 in line 524 may be withdrawn upstream of valve 531 and passed through valve 539 to be rejoined with the turbine exhaust in line 534 downstream of recuperator heat exchanger 529.

The turbine exhaust stream in line 534 is next passed through condenser 540 to remove water from the turbine exhaust stream. Condensed water is drawn off in line 541 through valve 542. A fraction of the condensed water can be recirculated back to the condenser in line 543 passing through pump 544 and heat exchanger 545. With the water being separated, a substantially pure stream of recycled $CO_2$ is delivered from condenser 540 through line 546. The recycled $CO_2$ can be passed through a variety of lines for diluting various streams, for recycle back to the combustor as a working fluid, for use as a coolant, and for optional venting. A portion of the recycled $CO_2$ can be captured as a product for sequestration, for use in EOR, or for other uses.

The recycled $CO_2$ in line 546 particularly is passed to the $CO_2$ recycle compressor 548 through line 547. The compressed recycled $CO_2$ is passed through heat exchanger 549 to increase the density of the recycled $CO_2$ before being pumped in $CO_2$ pump 550 to the pressure for input to the combustor 511. The high pressure recycled $CO_2$ stream is then passed sequentially in line 551 back through recuperator heat exchangers 529, 528, 527, and 526 to be re-heated to the temperature for input to the combustor 511. A portion of the high pressure recycled $CO_2$ can be drawn off at different temperatures for use as a coolant in the combined combustor 511 and turbine 525. In particular, it can be drawn off through valve 552 at an intermediate temperature between recuperator heat exchangers 527 and 528 and can be drawn off through valve 553 at a higher temperature between recuperator heat exchangers 526 and 527 to be passed through line 554. While is single valve is illustrated for each of valves 552 and 553, it is understood that a series of valves (e.g., two, three, or more) can be used in each instance. In optional embodiments, a portion of the recycled $CO_2$ stream can be taken from line 547 between heat exchanger 549 and pump 550 and be passed through valve 555 in line 556 to line 551 between pump 550 and recuperator heat exchanger 529. In addition to the foregoing, a portion of the turbine exhaust in line 534 can be drawn off before passage through the condenser 540 and be combined with the recycled $CO_2$ stream in line 547. In particular, turbine exhaust is drawn through valve 557 in line 558 and compressed in hot gas compressor 559. A portion of the gas leaving hot gas compressor 559 can be recirculated in line 560 through heat exchanger 561. The remaining portion of the gas passes in line 562 to be cooled in recuperator heat exchangers 528 and 529 before passing through valve 563 and being combined with the recycled $CO_2$ stream in line 547 between compressor 548 and heat exchanger 549. Upstream of this point, a portion of the recycled $CO_2$ stream can be passed in line 573 through valve 574 to turbine exhaust stream 534 between the recuperator heat exchanger 529 and the condenser 540.

Also between compressor 548 and heat exchanger 549, a portion of the recycled $CO_2$ stream is drawn off in line 572 for input to the oxidant compressor 512. This is in addition to the portion of the recycled $CO_2$ stream that passes from valve 564 to be added to the oxygen flowing in main oxidant line 507. Further, a portion of the stream in line 572 can be drawn off for input to line 524 between the valve 531 and the compressor 520.

As seen in FIG. 5, the power production system 500 includes a number of control elements (shaded circles) and associated sensors (shaded rectangles) interconnected with the working components described above as illustrated via dotted lines. Such network of sensors, control elements, and control lines can define one or more flow control logic sequences whereby flow of one or more fluids through one or more components of the power plant is controlled. For example, as previously described herein, the present control system can include a power control element 10 configured to receive a POWER DEMAND signal for the current power required to be delivered by the turbine 525. The power control element 10 can be configured to instruct one or both of valves 505 and 506 in the primary fuel line 503 and secondary fuel line 504, respectively, to open and/or close as needed to deliver the proper amount of fuel to the combustor 511 to meet the power demand. Although not shown in FIG. 5, as already described in relation to FIG. 3, the power control element 10 can further receive signals from pressure sensors and flow sensors in communication with the primary fuel line 503 and secondary fuel line 504.

As further seen in FIG. 5, flow through the recirculation line 530 back to the gland seal compressor 520 can be controlled via pressure control element 12 based at least in part upon pressure data received from pressure sensor 14 in line 524 upstream of the gland seal compressor. The pressure control element 12 particularly can be configured to open and close valve 533 in line 530 to allow or prevent flow therethrough. Flow of the stream exiting the gland seal compressor 520 through vent line 524 can be controlled by pressure control element 16 based at least in part upon pressure data received from pressure sensor 18. The pressure control element 16 particularly can be configured to open and close valve 531 in line 524 to allow or prevent flow therethrough. Valve 532 in line 524 can be opened and closed based upon control signals received from pressure control element 20, which itself receives data from pressure sensor 22 regarding the pressure in turbine exhaust line 534 downstream of recuperator heat exchanger 529. Pressure control element 20 further can be configured to control opening and closing of valve 519 in relation to in-flow of $CO_2$ to the gland seal compressor 520.

Liquid level control element 24 can be configured to control outflow from condenser 540 of the liquid water separated from the turbine exhaust stream from line 534. The liquid level control element 24 can open and close valve 542 in line 541 based at least in part upon data received from level sensor 26.

The flow of recycled $CO_2$ back to the combustor 511 and to various further components of the power production system can rely upon several different control elements configured to achieve different purposes. For example, diversion of a portion of the compressed recycled $CO_2$ stream leaving compressor 548 back to turbine exhaust line 534 immediately upstream from the compressor 540 can be controlled by pressure control element 28 based at least in part upon data received from pressure sensor 30 in line 547 between the heat exchanger 549 and the compressed recycled $CO_2$ stream pump 550. The optional recirculation of compressed recycled $CO_2$ stream in line 551 between the compressed recycled $CO_2$ stream compressor 550 and the recuperator heat exchanger 529 can be controlled by control element 32 utilizing data from flow sensor 34 to determine when to open and close valve 575 in flow line 576 so that a portion of the compressed recycled $CO_2$ stream in line 551 between pump 550 and valve 577 is recirculated back to line 547 between compressor 548 and heat exchanger 549. Flow out of the recycled $CO_2$ stream compressor 550 can be controlled using temperature control element 36 utilizing data received from the temperature sensor 38 providing the temperature of the turbine exhaust line in line 534 between the turbine 525 and the recuperator heat exchanger 526. The temperature control element 36 can be configured to open and close valve 577 in line 551 to vary the amount of the recycled $CO_2$ stream passed to combustor 511. The temperature control element 36 also can be configured to open and close valve 555 in line 556 to cause recirculation at least a portion of the recycled $CO_2$ stream in line 551 between the compressor 550 and the recuperator heat exchanger 529 back into line 547 between the heat exchanger 549 and the compressor 550.

As noted above, a portion of the recycled $CO_2$ stream in line 546 can pass through valve 564 for combination with the oxygen in oxidant line 507. Opening and closing of the valve 564 can be controlled by pressure control element 38 based at least in part on data received from pressure sensor 40 in line 509 between the heat exchanger 510 and the oxidant compressor 512. The pressure control element 38 can further control opening and closing of valve 578 to allow a portion of the diluted oxidant in line 509 to be vented through line 579. A further pressure control element 42 can control opening and closing of valve 566 in recirculation line 565 from line 509 between the oxidant compressor 512 and the heat exchanger 513 based at least in part on data received from pressure sensor 44. Temperature control element 46 is configured to monitor the temperature of the stream in line 509 exiting the heat exchanger 513 using temperature sensor 48. Flow control element 50 can be configured to open and close valve 568 in line 567 to control recirculation of compressed diluted oxidant in line 509 from a point between pump 514 and valve 515 based at least in part on data received from flow sensor 52 immediately upstream from pump 514.

Pressure control element 54 can provide significant control over the amount of oxidant flowing in the primary oxidant flow line 516 and the secondary oxidant flow line 517. In particular, pressure control element 54 can control opening and closing of valve 515 in line 509 and valve 570 in line 569 to determine how much of the diluted oxidant in line 509 flows to the combustor versus being recirculated to a point upstream of the pump 514. Pressure control element 54 further controls valve 580, which particularly can determine how much of the diluted oxidant passes through the primary oxidant line 516 or is forced to the secondary oxidant line 517. Such controls can be based at least in part on data received from pressure sensor 56 and pressure sensor 58. The pressure control element 54 further can be configured to control the upstream pressure of the oxidant system during start-up to ensure that the valves can control the flow of oxidant until the pump 514 is operating and controlling the flow.

Ratio control element 60 can be configured to control the ratio of oxygen to $CO_2$ in the oxidant line 509. In particular, the ratio control element 60 can receive data regarding $CO_2$ flow in line 546 from flow sensor 62 and can receive data regarding oxygen flow from sensor 64 in line 507. Further, the oxygen concentration in line 509 between valve 115 and recuperator heat exchanger 529 can be provided from oxygen sensor 66. Based on received data, the ratio control element 60 can open and close valve 508 in line 507 to adjust the amount of oxygen being added to the $CO_2$ flow in ling 509 to provide the desired oxygen to $CO_2$ ratio. For example, in some embodiments, an oxygen to $CO_2$ ratio can preferably be about 10:90 to about 90:10, more preferably about 10:90 to about 50:50, or about 15:85 to about 30:70.

In addition, equivalence control element 68 and flow control element 70 can be configured to control the amount of oxidant entering the secondary oxidant line 517 based on the amount of fuel entering the secondary fuel flow line 504. To this end, data can be received from flow sensor 72 in the secondary fuel flow line 504, from flow sensor 74 in the primary fuel flow line 503, and from flow sensor 76 in the secondary oxidant line 517. Based upon such data, valve 571 can be opened or closed to adjust the amount of oxidant entering the combustor 511 through the secondary oxidant line 517.

Flow control element 78 can be configured to control an optional purge flow of $CO_2$ through lines 581 and 582. The purge flow can be needed for the high flow oxidant line 516 when there is no oxidant flow in such line. This ensures that there is not back flow of combustion products into the recuperator heat exchangers 526, 527, 528, and 529. This can also provide the ability to purge the primary fuel flow line 503 when needed.

Many modifications and other embodiments of the presently disclosed subject matter will come to mind to one skilled in the art to which this subject matter pertains having the benefit of the teachings presented in the foregoing descriptions and the associated drawings. Therefore, it is to be understood that the present disclosure is not to be limited to the specific embodiments described herein and that modifications and other embodiments are intended to be included within the scope of the appended claims. Although specific terms are employed herein, they are used in a generic and descriptive sense only and not for purposes of limitation.

The invention claimed is:

1. A control system for a power production plant, the control system comprising a flow control logic sequence adapted for:
   receiving a POWER ACTUAL signal that relays an actual power production by the power production plant at a given time;
   receiving a POWER DEMAND signal that relays a desired power production by the plant at the same given time;
   calculating a first differential between the POWER DEMAND signal and the POWER ACTUAL signal and converting the first differential into a FUEL FLOW DEMAND signal indicating a desired flow of a fuel to a combustor;
   generating a TURBINE INLET TEMPERATURE signal representing a temperature of an inlet of a turbine, the TURBINE INLET TEMPERATURE signal being a selection of the highest of a plurality of calculated temperature signals each respectively derived from different calculation routines for calculating the temperature at the inlet of the turbine;
   calculating a second differential between the TURBINE INLET TEMPERATURE signal and a maximum turbine inlet temperature; and
   regulating one or both of a mass and a pressure of the fuel flowing from a fuel supply system to the combustor based upon a selection of the lower of the FUEL FLOW DEMAND signal and the second differential.

2. The control system according to claim 1, wherein the control system is adapted to adjust a ratio of a mass or a volume of fuel flowing through two or more different fuel lines from the fuel supply system to the combustor.

3. The control system according to claim 2, wherein the control system is adapted to open/close flow control valves in each of the two or more different fuel lines.

4. The control system according to claim 3, wherein the control system is adapted to open/close at least one pressure control valve in each of the two or more different fuel lines.

5. The control system according to claim 2, wherein the control system is adapted to adjust a ratio of a mass or a volume of oxidant flowing through two or more different oxidant lines from an oxidant supply system to the combustor.

6. The control system according to claim 5, wherein the control system is adapted to adjust a fuel to oxidant ratio in one of the two or more fuel lines and one of the two or more oxidant lines independent of a fuel to oxidant ratio in another of the two or more fuel lines and another of the two or more oxidant lines.

7. The control system according to claim 5, wherein the power production plant includes a line providing a stream of recycled $CO_2$, wherein a portion of the stream of recycled $CO_2$ is added to one or more of the two or more oxidant lines, and wherein the control system is adapted to adjust an oxygen concentration in one or more of the two or more oxidant lines by adjusting an amount of the recycled $CO_2$ that is added to the oxidant line.

8. The control system according to claim 7, wherein the oxygen concentration in each of the one or more oxidant lines is adjusted independently from the remaining oxidant lines.

9. The control system according to claim 7, wherein the control system is adapted to adjust an equivalence ratio between the mass or volume of oxidant flowing through one of the two or more oxidant lines and another of the two or more oxidant lines.

10. The control system according to claim 2, wherein the control system is adapted to close a flow control valve in a primary fuel line from the two or more fuel lines to the combustor so that substantially no fuel flows through the primary fuel line and is adapted to open a flow control valve in a secondary fuel line from the two or more fuel lines to the combustor so that substantially all of the fuel flowing to the combustor is flowing through the secondary fuel line.

11. The control system according to claim 10, wherein the control system is adapted to adjust an equivalence ratio between the mass or volume of fuel flowing through the primary fuel line and the secondary fuel line.

12. The control system according to claim 10, wherein the control system is adapted to provide a configuration of the flow control valve in the primary fuel line and the flow control valve in the secondary fuel line during startup of the power production plant and is configured to synchronize opening of the valve in the primary fuel line with a working condition of one or both of the turbine and a compressor that compresses a stream of recycled $CO_2$ flowing to the combustor.

13. The control system according to claim 2, wherein the control system is adapted to hold or lower the mass or volume of fuel flowing through at least one of the two or more different fuel lines from the fuel supply system to the combustor in response to an input signal indicating an operating temperature of a heat exchanger is approaching or exceeding a predefined operating maximum temperature or rate of heat increase.

14. A power production plant comprising:
   a combustor;
   a turbine;
   a generator;
   a fuel supply system;
   an oxidant supply system;

a control system having a plurality of control paths for automated control of at least one act in operation of the power production plant, said control system including a control path adapted to generate a control signal that is a function of:
- a comparison of a POWER ACTUAL signal relaying an actual power production by the power production plant at a given time and a POWER DEMAND signal relaying a desired power production by the plant at the same given time to generate a FUEL FLOW DEMAND signal for flow of a fuel to the combustor;
- generation of a TURBINE INLET TEMPERATURE signal for a temperature of an inlet of the turbine by a selection of the highest of a plurality of calculated temperature signals each respectively derived from different calculation routines for calculating the temperature at the inlet of the turbine; and
- calculation of a differential between the TURBINE INLET TEMPERATURE signal and a maximum turbine inlet temperature;

said control path including a logic sequence adapted for selecting the lower of the FUEL FLOW DEMAND signal and the differential, and said generated control signal being effective to regulate one or both of the mass and pressure of fuel flowing from the fuel supply system to the combustor.

15. The power production plant of claim 14, wherein the fuel supply system comprises at least two separately controlled fuel lines configured for passage of fuel to the combustor.

16. The power production plant of claim 15, wherein the oxidant supply system comprises at least two separately controlled oxidant lines configured for passage of oxidant to the combustor.

17. The power production plant of claim 16, wherein the oxidant supply system comprises at least one flow control valve in each of the at least two separately controlled oxidant lines.

18. The power production plant of claim 17, wherein the control system is further configured to output one or more further control signals to one or more of the at least one flow control valve in each of the at least two separately controlled oxidant lines so as to adjust the mass or volume of oxidant flowing through the at least two separately controlled oxidant lines and thereby adjust an equivalence ratio between the mass or volume of oxidant flowing through the at least two separately controlled oxidant lines.

19. The power production plant of claim 18, wherein one of the at least two separately controlled oxidant lines is a secondary oxidant flow line that comprises a flow sensor, wherein one of the at least two separately controlled fuel lines is a secondary fuel flow line that comprises a flow sensor, and wherein the control system is further configured to output one or more further control signals to open or close the flow control valve in the secondary oxidant flow line based upon a mass or volume flow of fuel through the secondary fuel flow line.

20. The power production plant of claim 15, wherein the fuel supply system comprises at least one flow control valve and at least one pressure control valve in each of the at least two separately controlled fuel lines.

* * * * *